(12) United States Patent
Muramatsu et al.

(10) Patent No.: US 8,657,510 B2
(45) Date of Patent: Feb. 25, 2014

(54) APERTURE STOP MECHANISM WHICH DRIVES TWO APERTURE BLADES AND ADJUSTS AN APERTURE AREA OF LIGHT PASSAGE OPENING INTO WHICH LIGHT FOR IMAGING IS INTRODUCED

(75) Inventors: Hideaki Muramatsu, Yokohama (JP); Takashi Ono, Fujisawa (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 13/512,244

(22) PCT Filed: Nov. 26, 2010

(86) PCT No.: PCT/JP2010/006923
§ 371 (c)(1),
(2), (4) Date: May 25, 2012

(87) PCT Pub. No.: WO2011/065017
PCT Pub. Date: Jun. 3, 2011

(65) Prior Publication Data
US 2012/0288271 A1     Nov. 15, 2012

(30) Foreign Application Priority Data
Nov. 27, 2009   (JP) ................................. 2009-270459

(51) Int. Cl.
*G03B 9/02*          (2006.01)
(52) U.S. Cl.
USPC ....................................................... 396/505
(58) Field of Classification Search
USPC ......... 396/505, 508, 450, 241, 257–262, 488, 396/490, 484, 485, 483
See application file for complete search history.

(56) References Cited

U.S. PATENT DOCUMENTS

| 4,727,389 A * | 2/1988 | Raschke .................... 396/103 |
| 4,797,700 A * | 1/1989 | Tsuji et al. ................. 396/508 |
| 7,365,791 B2 * | 4/2008 | Ikeda ........................ 348/363 |
| 2007/0086772 A1 * | 4/2007 | Shinohara ................ 396/241 |
| 2012/0288271 A1 * | 11/2012 | Muramatsu et al. ...... 396/505 |

FOREIGN PATENT DOCUMENTS

| JP | 07-264467 A | 10/1995 |
| JP | 08-237544 A | 9/1996 |
| JP | 9-197475 A | 7/1997 |
| JP | 2000-111970 A | 4/2000 |
| JP | 2001-147460 A | 5/2001 |
| JP | 2002-182264 A | 6/2002 |
| JP | 2003-344895 A | 12/2003 |
| JP | 2007-101709 A | 4/2007 |

\* cited by examiner

*Primary Examiner* — W B Perkey
(74) *Attorney, Agent, or Firm* — Venable LLP; Michael A. Sartori; Christopher B. Tokarczyk

(57) ABSTRACT

In an aperture stop mechanism, two aperture blades are arranged so as to overlap each other and form a single light passage opening into which light utilized in imaging is introduced with the respective edge portions of the two aperture blades. A drive mechanism drives the two aperture blades in directions different from each other, whereby the aperture area of the light passage opening is changed within a predetermined range. When the two aperture blades are located at a minimum aperture position where the aperture area of the light passage opening is minimum within the predetermined range, the two aperture blades are provided so that the single light passage opening surrounded by boundaries including eight straight lines is constituted of the respective edge portions of the two aperture blades.

11 Claims, 22 Drawing Sheets

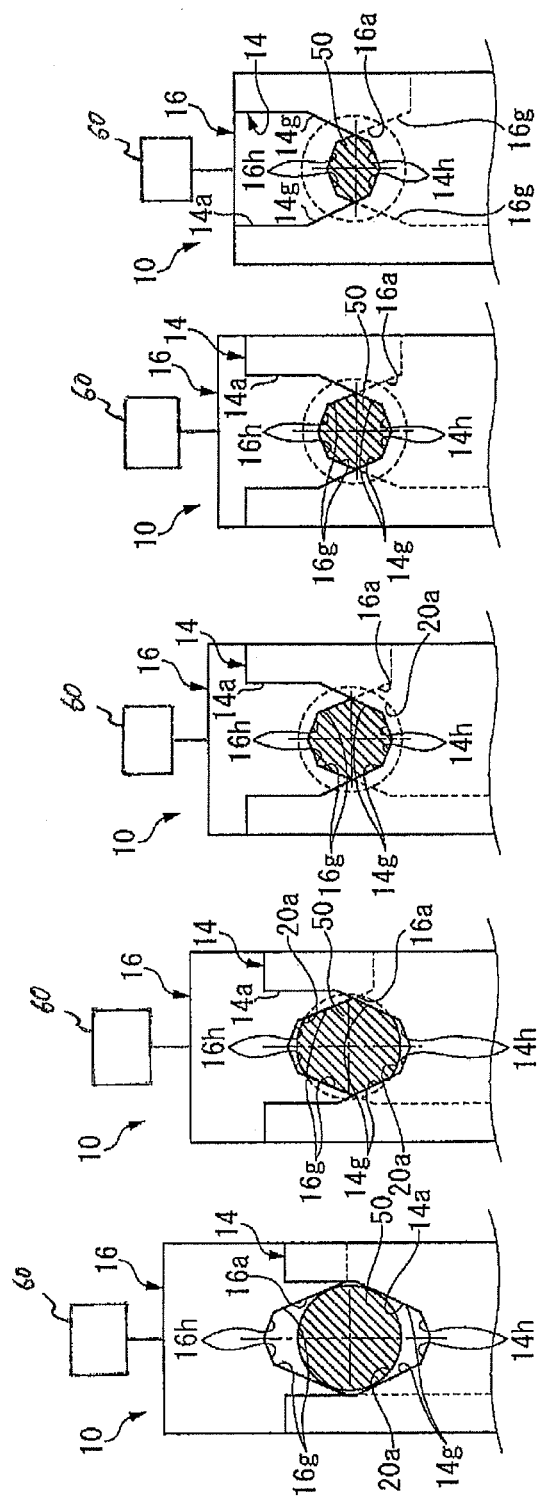

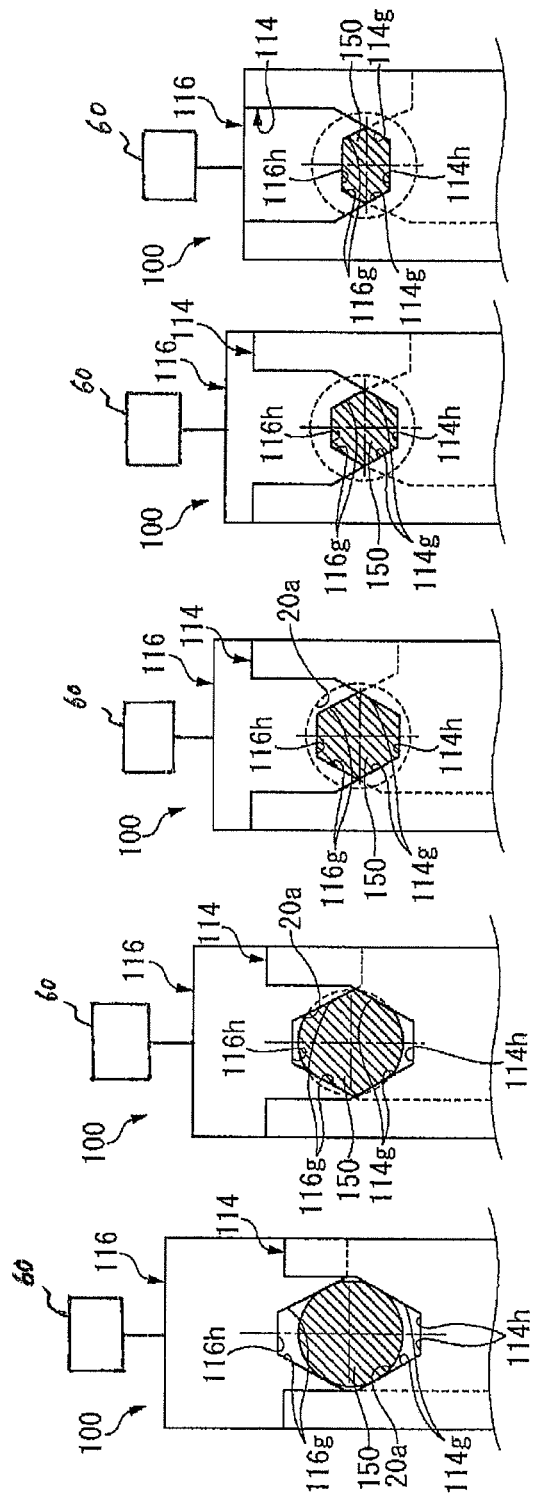

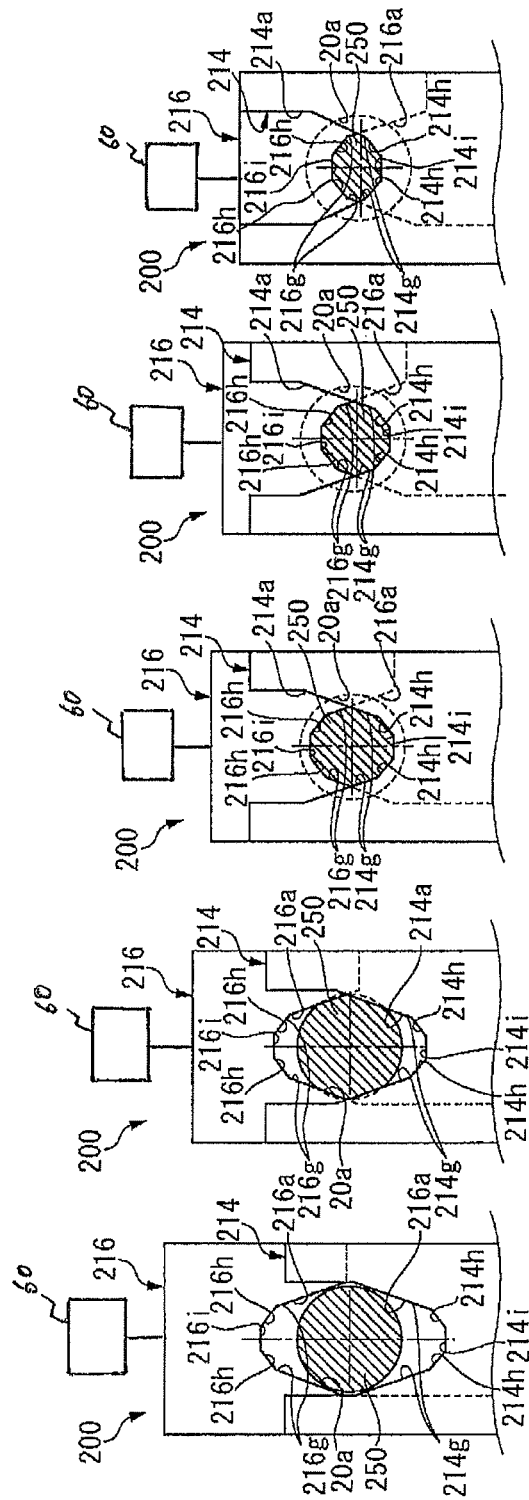

APERTURE STOP MECHANISM WHICH DRIVES TWO APERTURE BLADES AND ADJUSTS AN APERTURE AREA OF LIGHT PASSAGE OPENING INTO WHICH LIGHT FOR IMAGING IS INTRODUCED

FIELD OF THE INVENTION

The present invention relates to an aperture stop mechanism, and relates particularly to an aperture stop mechanism which drives two aperture blades and adjusts an aperture area of a light passage opening into which light for imaging is introduced.

DESCRIPTION OF THE RELATED ART

In the related art, there has been known an aperture stop mechanism which forms a light passage opening using two aperture blades and moves the two aperture blades in a direction of being approached to and spaced apart from each other to thereby adjust an aperture area of the light passage opening and, thus, to adjust light amount (for example, see Patent Literature 1 or 2). Further, there has been known a technique for minimizing the aperture area of the light passage opening and then adjusting exposure with an electronic shutter (for example, see Patent Literature 3).

CITATION LIST

Patent Literature

Patent Literature 1: Japanese Patent Application Laid-Open No. 2002-182264
Patent Literature 2: Japanese Patent Application Laid-Open No. 2000-111970
Patent Literature 3: Japanese Patent Application Laid-Open No. 8-237544

DISCLOSURE OF THE INVENTION

Problems to be Solved by the Invention

In the aperture stop mechanisms described in the Patent Literature 1 or 2, when the aperture area of the light passage opening is reduced, the shape of the light passage opening is a diamond shape. If the shape of the light passage opening is a diamond shape, for example when photographing is performed so that the background is defocused to make a subject prominent, a blurred image of the background has a diamond shape, so that the background may become unnatural. Meanwhile, in order to avoid such a phenomenon, as described in the Patent Literature 3, there is considered a technique for switching to adjustment of exposure using an electronic shutter before the aperture area of the light passage opening is reduced so small. However, if the switching to the electronic shutter is performed before the aperture area of the light passage opening is reduced so small, strong light is applied to an imaging device, and this may cause influence on image quality such as smear.

The present invention has been made in order to solve the above problem and it is therefore an object of the present invention to provide an aperture stop mechanism which suppresses unnaturalness of a blurred image of the background.

Means for Solving the Problems

In order to solve the above problem, an aperture stop mechanism in an embodiment of the present invention comprises two aperture blades and a drive mechanism. The two aperture blades are arranged so as to overlap each other and form a single light passage opening into which light utilized in imaging is introduced with the respective edge portions of the two aperture blades. The drive mechanism drives the two aperture blades in directions different from each other and thereby changes the aperture area of the light passage opening. The two aperture blades are provided so as to form the single light passage opening, surrounded by boundaries including five or more straight lines, with the respective edge portions of the two aperture blades.

Effect of the Invention

The present invention can provide an aperture stop mechanism which suppresses unnaturalness of a blurred image of the background.

BRIEF DESCRIPTION OF THE DRAWINGS

FIGS. 7A to 7E are views showing a change of the shape of the light passage opening when the two aperture blades are approached to each other;

FIGS. 14A to 14E are views showing a change of a shape of a light passage opening when the two aperture blades are approached to each other;

FIGS. 21A to 21E are views showing a change of a shape of a light passage opening when the two aperture blades are approached to each other.

BEST MODE FOR CARRYING OUT THE INVENTION

Hereinafter, embodiments of the present invention (hereinafter referred to as embodiments) will be described in detail with reference to the drawings.

First Embodiment

Figure 1:
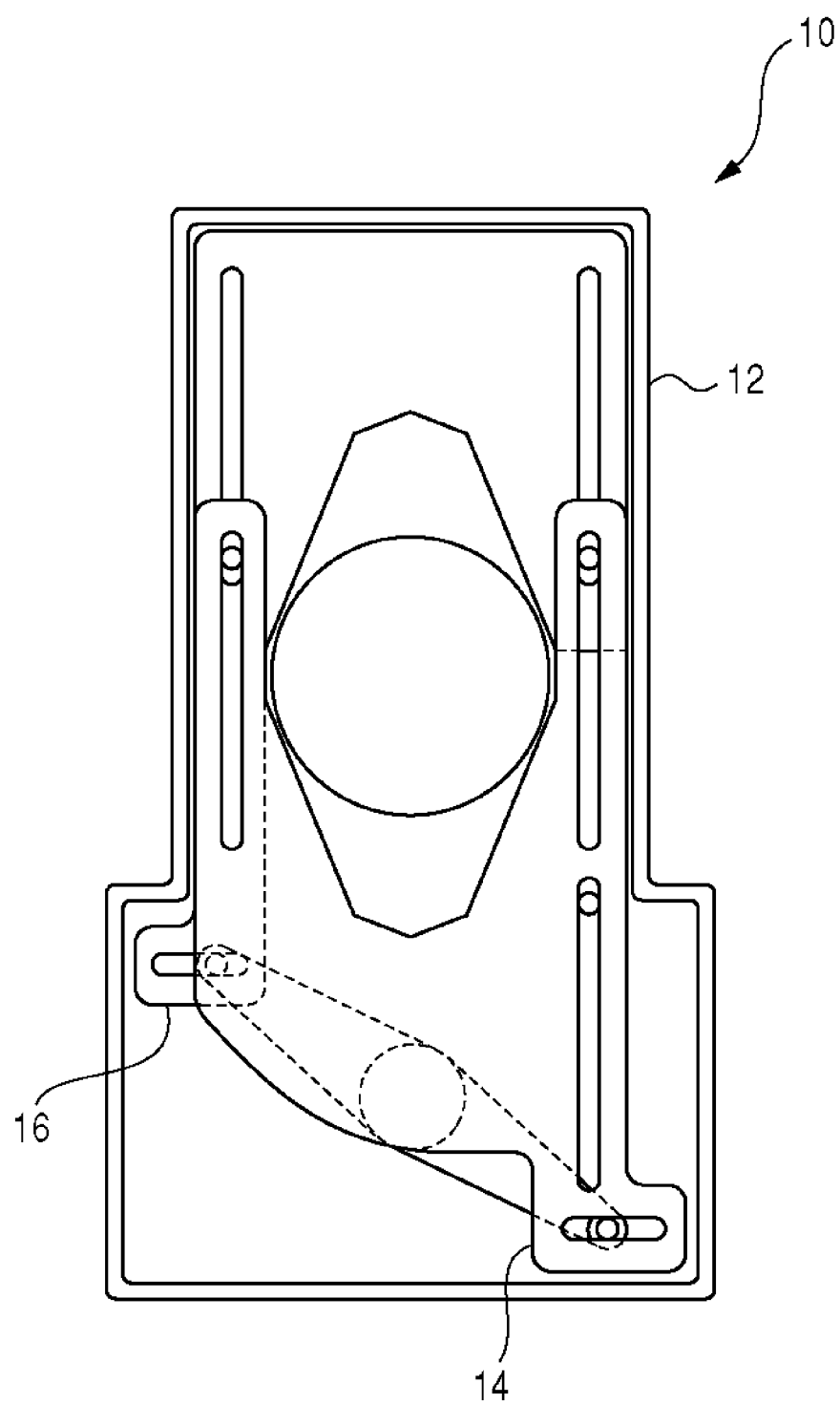
FIG. 1 is a front view of an aperture stop mechanism according to a first embodiment.

FIG. 1 is a front view of an aperture stop mechanism 10 according to the first embodiment. The aperture stop mechanism 10 has a base unit 12 and two aperture blades 14 and 16. The two aperture blades 14 and 16 are provided movable in a vertical direction in FIG. 1 so as to be spaced apart from and approached to each other. Hereinafter, for ease of understanding, the direction in which each of the two aperture blades 14 and 16 can be moved is referred to as a "vertical direction". Meanwhile, a direction perpendicular to the direction in which each of the two aperture blades 14 and 16 can be moved is referred to as a "horizontal direction".

Figure 2:
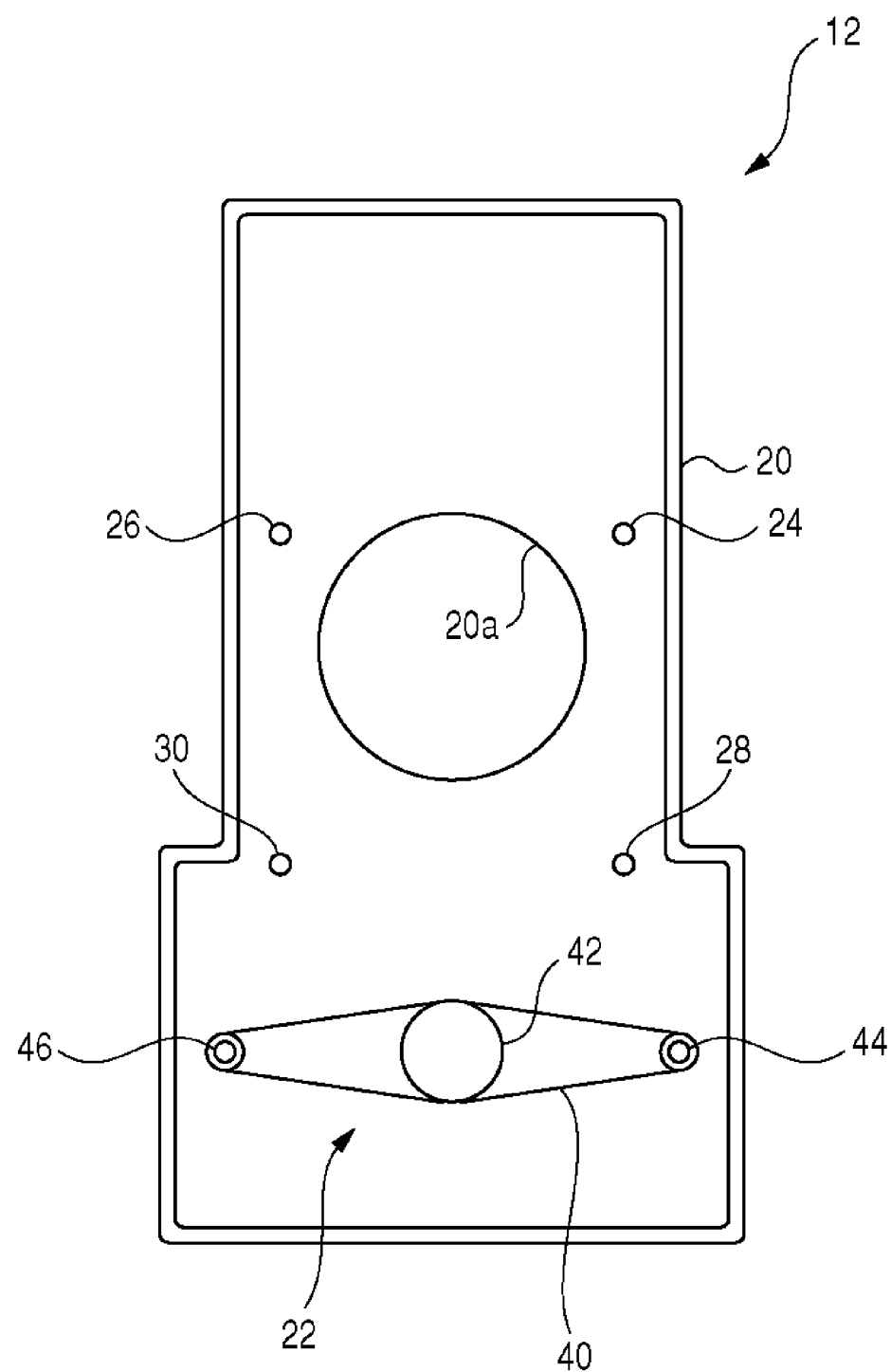
FIG. 2 is a front view of a base unit.

FIG. 2 is a front view of the base unit 12. The base unit 12 has a base plate 20, a drive mechanism 22, and guide pins 24, 26, 28, and 30. The base plate 20 is formed into a substantially rectangular plate shape extending in the vertical direction, and an edge portion is vertically bent to provide a flange. A fixed aperture hole 20a which is a circular opening portion is provided at the substantially center of the base plate 20.

The drive mechanism 22 has a swing rod 40, a swing shaft 42, and connecting pins 44 and 46. The swing shaft 42 is attached near an end of the guide pin 30. The center of the swing rod 40 is swingably supported by the swing shaft 42. The connecting pins 44 and 46 are provided at the respective ends of the swing rod 40 so that the axial direction is vertical to the base plate 20.

The guide pins 24, 26, 28, and 30 are each provided around the fixed aperture hole 20a and arranged on the base plate 20 so that the axial directions protrude so as to face perpendicular with respect to the base plate 20. Specifically, the guide pins 24 and 26 and the guide pins 28 and 30 are respectively arranged to be aligned in the horizontal direction. The guide pins 28 and 30 are arranged at a position near the drive mechanism 22 in comparison with the guide pins 24 and 26. The guide pins 24 and 28 are arranged to be aligned with the connecting pin 44 in the vertical direction. The guide pins 26 and 30 are arranged to be aligned with the connecting pin 46 in the vertical direction.

Figure 3:
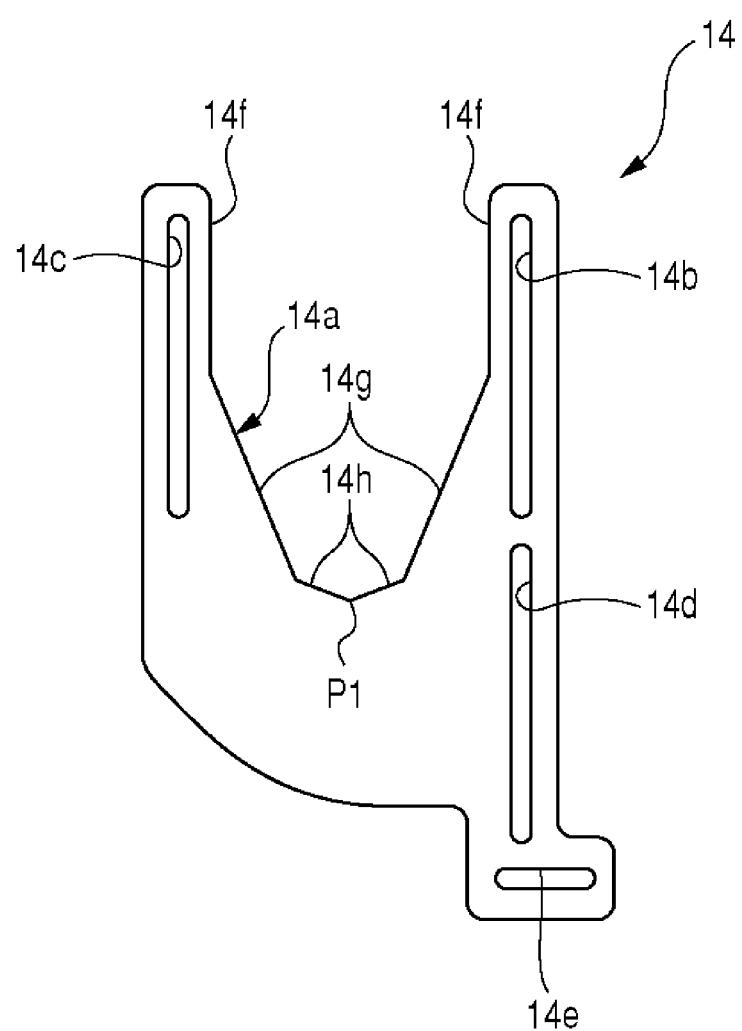
FIG. 3 is a front view of an aperture blade.

FIG. 3 is a front view of the aperture blade 14. The aperture blade 14 is formed into a plate shape having a recess 14a formed so as to be incised. The aperture blade 14 has long guide holes 14b, 14c, and 14d and a connecting hole 14e.

The guide holes 14b, 14c, and 14d are each provided extending in the vertical direction. The guide holes 14b and 14d and the connecting hole 14e are arranged to be aligned in the vertical direction in this order. The guide holes 14b and 14d are formed extending on the same straight line. The connecting hole 14e is formed extending in the horizontal direction. The guide holes 14c and 14b are formed to be aligned in the horizontal direction.

The recess 14a is provided between the guide holes 14b and 14c. A pair of first edge portions 14f is, at its one end, connected to the recess 14a and formed extending in parallel with the vertical direction.

The recess 14a includes a pair of second edge portions 14g and a pair of third edge portions 14h. The second edge portions 14g as a pair are each formed linearly and have the same length. Each one end of the pair of second edge portions 14g is connected to each one end of the pair of first edge portions 14f extending in parallel with the vertical direction. Each of the pair of second edge portions 14g is inclined at a predetermined angle with respect to the vertical direction so as to approach to each other as they approach to the other end.

The third edge portions 14h as a pair are each formed linearly and have the same length, and each one end is connected to the other end of each of the pair of second edge portions 14g. The other ends of the third edge portions 14h as a pair are connected to each other. Each of the pair of third edge portions 14h is inclined at a predetermined angle with respect to the vertical direction so as to approach to each other as they approach to the other end. At this time, the inclination angle of the third edge portion 14h with respect to the vertical direction is larger than the inclination angle of the second edge portion 14g with respect to the vertical direction. Thus, the recess 14a is formed symmetrically around a line passing through an intersection P1 of the pair of third edge portions 14h and parallel to the vertical direction.

Figure 4:
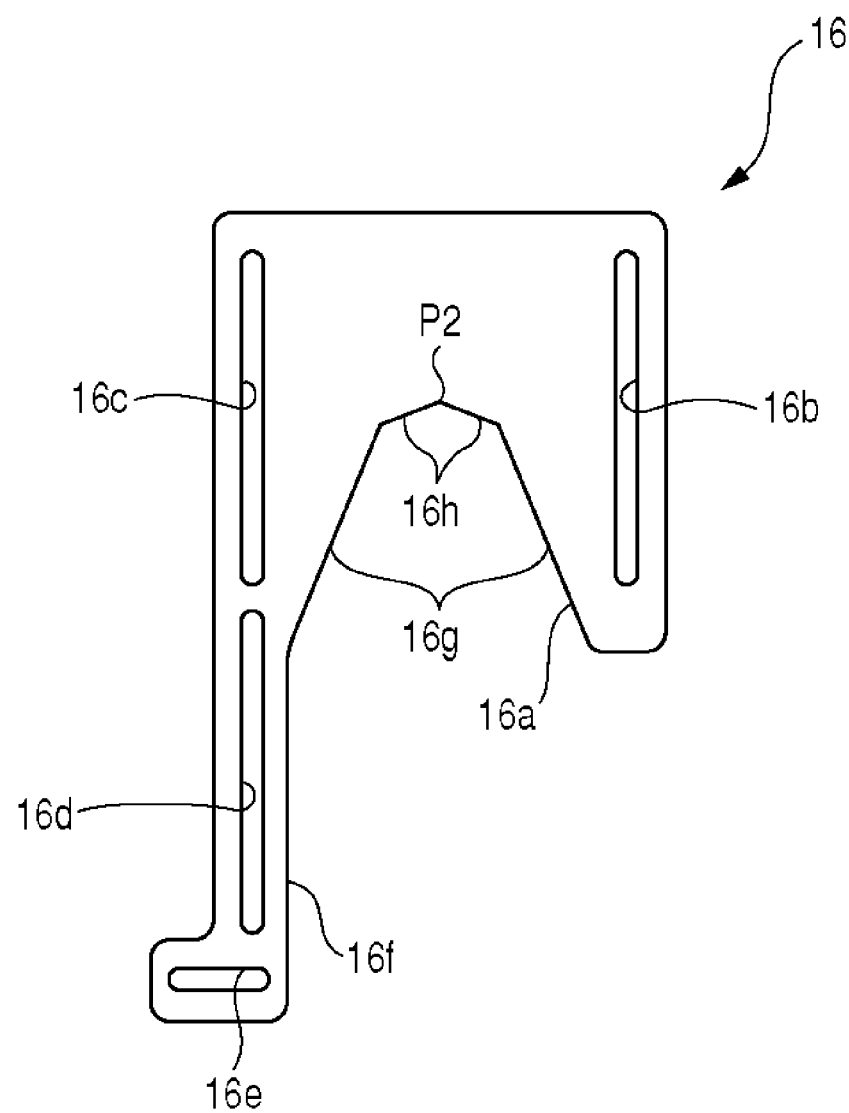
FIG. 4 is a front view of an aperture blade.

FIG. 4 is a front view of the aperture blade 16. The aperture blade 16 is formed into a plate shape having a recess 16a formed so as to be incised. The aperture blade 16 has long guide holes 16b, 16c, and 16d and a connecting hole 16e.

The guide holes 16b, 16c, and 16d are each provided extending in the vertical direction. The guide holes 16c and 16d and the connecting hole 16e are formed to be aligned in the vertical direction in this order. The guide holes 16b and 16d are formed extending on the same straight line. The connecting hole 16e is formed extending in the horizontal direction. The guide hole 16b is formed to be aligned with the guide hole 16c in the horizontal direction.

The recess 16a is provided between the guide holes 16b and 16c. The recess 16a includes a pair of second edge portions 16g and a pair of third edge portions 16h.

The inside of the guide hole 16d has a first edge portion 16f extending in the vertical direction. In one of the pair of second edge portions 16g, its one end is connected to an end of the first edge portion 16f. The second edge portions 16g as a pair are each formed linearly, have the same length, and are inclined at a predetermined angle with respect to the vertical direction so as to approach to each other as they approach to the other end.

The third edge portions 16h as a pair are each formed linearly and have the same length, and each one end of the third edge portions 16h is connected to the other end of each of the pair of second edge portions 16g. In the pair of third edge portions 16h, the other ends are connected to each other. Each of the pair of third edge portions 16h is inclined at a predetermined angle with respect to the vertical direction so as to approach to each other as they approach to the other end. At this time, the inclination angle of the third edge portion 16h with respect to the vertical direction is larger than the inclination angle of the second edge portion 16g with respect to the vertical direction. Thus, the recess 16a is formed symmetrically around a line passing through an intersection P2 of the pair of third edge portions 16h and parallel to the vertical direction.

Figure 5:
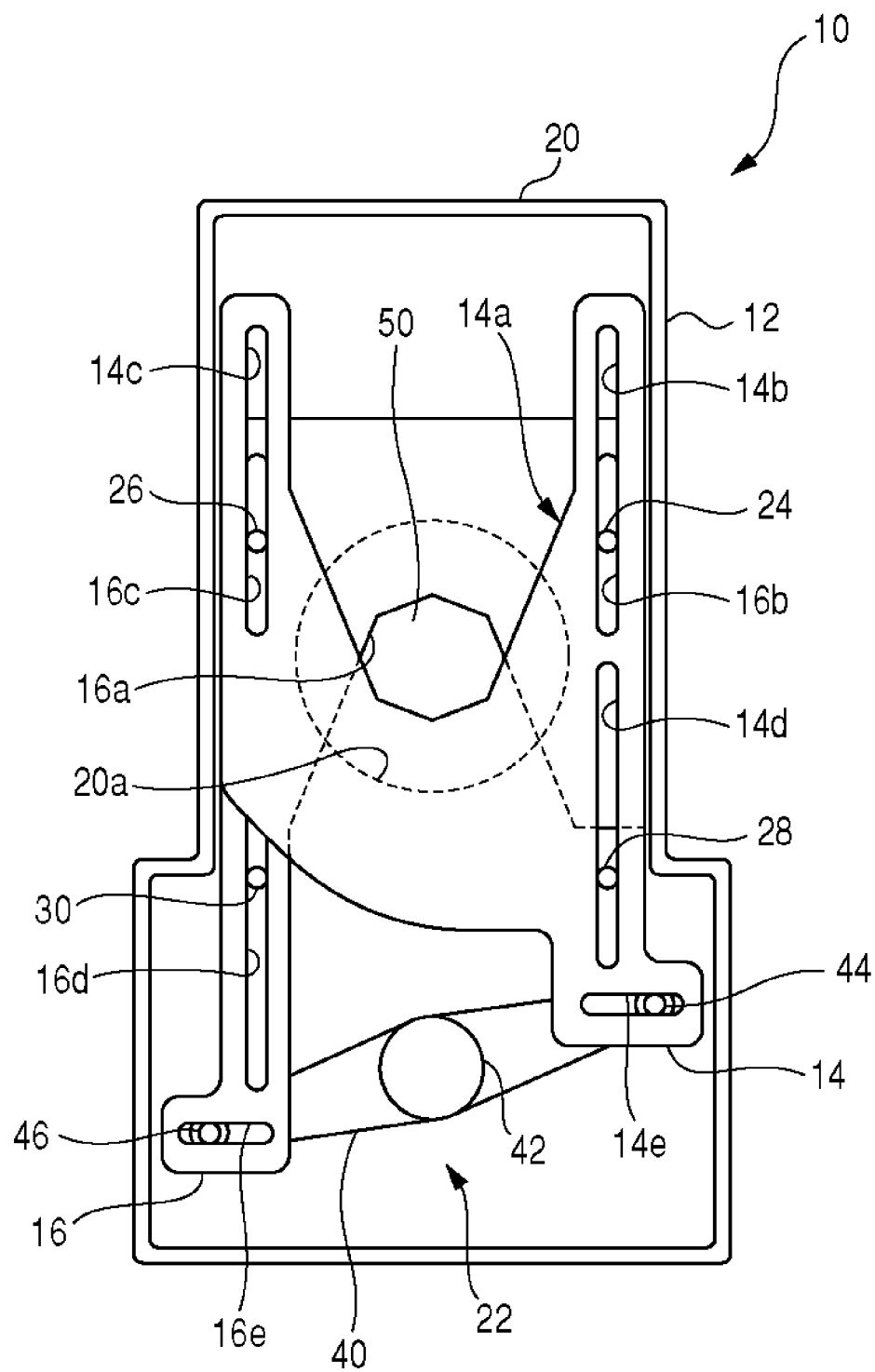
FIG. 5 is a front view of the aperture stop mechanism when the two aperture blades are attached to the base unit.

FIG. 5 is a front view of the aperture stop mechanism 10 when the two aperture blades 14 and 16 are attached to the base unit 12. First, the aperture blade 16 is attached to the base plate 20. At this time, the guide pin 24 is inserted into the guide hole 16b, the guide pin 26 is inserted into the guide hole 16c, and the guide pin 30 is inserted into the guide hole 16d.

According to this constitution, the aperture blade 16 can be moved in the vertical direction, and the movement in the horizontal direction is limited. The connecting pin 46 of the swing rod 40 is inserted into the connecting hole 16*e*.

Next, the aperture blade 14 is attached to the base plate 20 so as to be superposed on the aperture blade 16. At this time, the guide pin 24 is inserted into the guide hole 14*b*, the guide pin 26 is inserted into the guide hole 14*c*, and the guide pin 28 is inserted into the guide hole 14*d*. According to this constitution, the aperture blade 14 can be moved in the vertical direction, and the movement in the horizontal direction is limited. The connecting pin 44 of the swing rod 40 is inserted into the connecting hole 14*e*.

When the two aperture blades 14 and 16 are attached to the base unit 12, the recesses 14*a* and 16*a* are opened to face each other. In the two aperture blades 14 and 16, a single light passage opening 50 into which light utilized for imaging is introduced is constituted of the recesses 14*a* and 16*a* as the edge portions. The drive mechanism 22 swings the swing rod 40 to thereby drive the two aperture blades 14 and 16 in directions opposite to each other in parallel with the vertical direction so that the aperture blades 14 and 16 are approached to and spaced apart from each other, so that the aperture area of the light passage opening 50 is changed.

The two aperture blades 14 and 16 may be each provided movably so as to curve, for example. Also in this case, the drive mechanism 22 drives the two aperture blades 14 and 16 in directions different from each other, whereby the aperture area of the light passage opening 50 may be changed.

The drive mechanism 22 drives the two aperture blades 14 and 16 so that the aperture area of the light passage opening 50 is adjusted within a predetermined range. Specifically, the drive mechanism 22 drives the two aperture blades 14 and 16 from a minimum aperture position where the aperture area of the light passage opening 50 is minimum to a maximum aperture position where the aperture area of the light passage opening 50 is maximum.

Figure 6B:
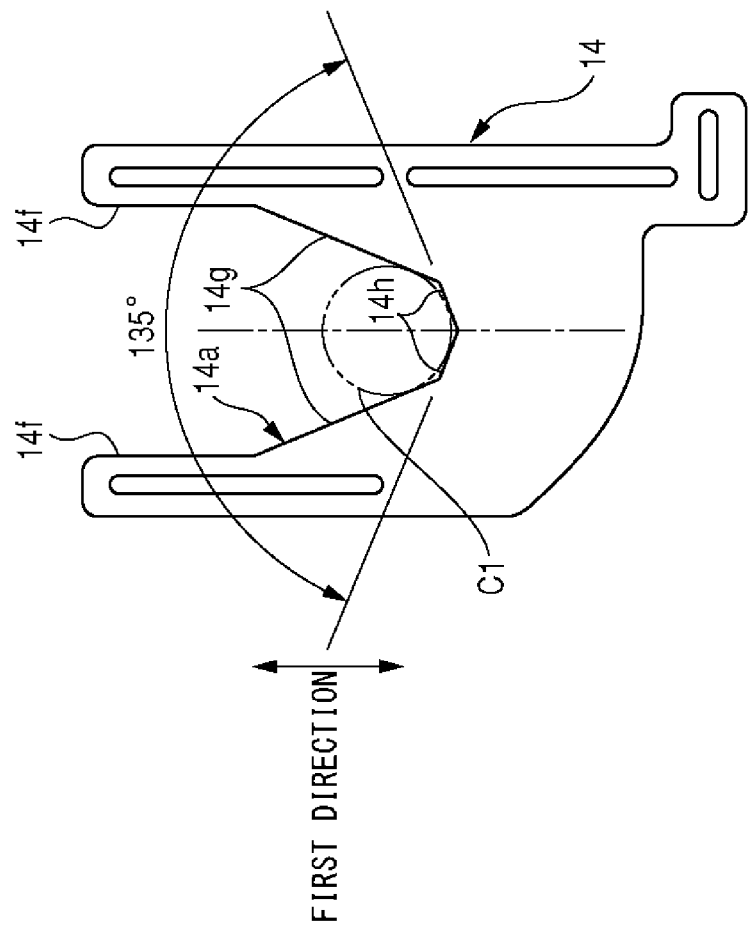
FIGS. 6A and 6B are views showing a method of determining a shape of a recess.
Figure 6A:
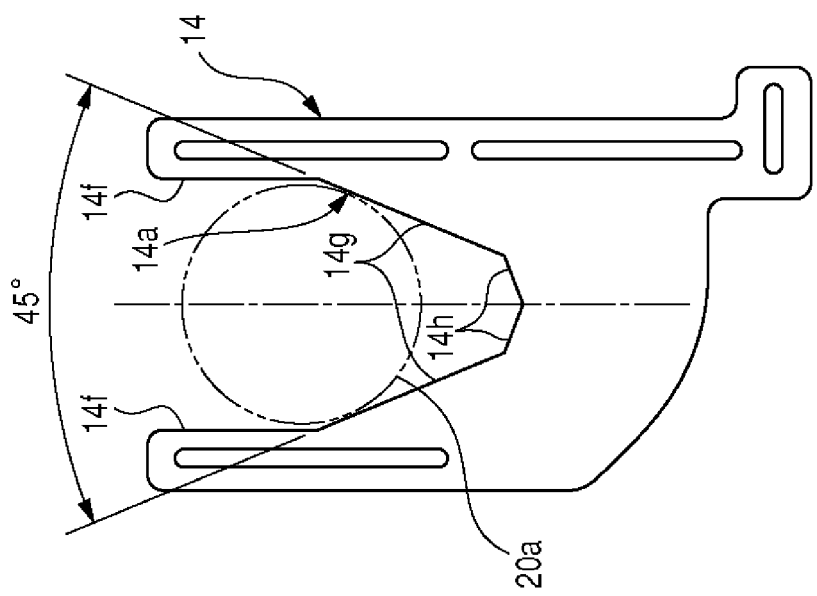

FIG. 6A is a view showing a method of determining a shape of the recess 14*a*. The pair of first edge portions 14*f* is formed so that an interval between the first edge portions 14*f* is the same as or slightly larger than the fixed aperture hole 20*a*. The pair of second edge portions 14*g* is formed so that the second edge portions 14*g* form 45°. Accordingly, the pair of second edge portions 14*g* is inclined at 22.5° with respect to the vertical direction. The pair of second edge portions 14*g* is provided at a position circumscribed with the fixed aperture hole 20*a* when the aperture blade 14 is located at the maximum aperture position.

As with FIG. 6A, FIG. 6B is a view showing the method of determining the shape of the recess 14*a*. A virtual circle C1 having the aperture area for realizing the most frequently used F value is inscribed with the pair of second edge portions 14*g* determined in FIG. 6A. In the first embodiment, the most frequently used F value is 4. It will be understood that the F value at this time is not limited to 4.

The pair of third edge portions 14*h* is formed so that the third edge portions form an interior angle of 135°. Accordingly, the pair of third edge portions 14*h* is inclined at 67.5° with respect to the vertical direction and formed so that the third edge portions 14*h* and the second edge portions 14*g* form an interior angle of 135°. The pair of third edge portions 14*h* is formed to be circumscribed with the virtual circle C1. Thus, each shape of the pair of first edge portions 14*f*, the pair of second edge portions 14*g*, and the pair of third edge portions 14*h* is determined.

The recess 16*a* is formed into the same shape as the recess 14*a* except that the opening direction is opposite. Accordingly, the pair of second edge portions 16*g* is inclined at 22.5° with respect to the vertical direction, and the pair of third edge portions 16*h* is inclined at 67.5° with respect to the vertical direction. The pair of second edge portions 16*g* is similar to the pair of second edge portions 14*g* in that the pair of second edge portions 16*g* is provided to be circumscribed with the fixed aperture hole 20*a* when the aperture blade 16 is located at the maximum aperture position. The recess 16*a* may be formed into a shape different from the recess 14*a*.

FIGS. 7A to 7E are views showing a change of the shape of the light passage opening 50 when the two aperture blades 14 and 16 are approached to each other. For ease of understanding, each shape of the two aperture blades 14 and 16 is schematically shown.

FIG. 7A is a front view of the aperture stop mechanism 10 when the two aperture blades 14 and 16 are located at the maximum aperture position to which the two aperture blades 14 and 16 move the most so that the light amount passing through the light passage opening 50 is maximum. When the two aperture blades 14 and 16 are located at the maximum aperture position, light shielding of the fixed aperture hole 20*a* according to the two aperture blades 14 and 16 is completely released. Thus, the aperture area of the light passage opening 50 is the aperture area of the fixed aperture hole 20*a*.

FIG. 7B is a front view of the aperture mechanism 10 when each of the two aperture blades 14 and 16 is approached to each other by a predetermined distance from the maximum aperture position. In this state, a portion of the pair of second edge portions 14*g* and a portion of the pair of second edge portions 16*g* are located inside the fixed aperture hole 20*a*, and a part of light to be passed through the fixed aperture hole 20*a* is shielded. However, the pair of third edge portions 14*h* and the pair of third edge portions 16*h* remain located outside the fixed aperture hole 20*a*. Thus, the light passage opening 50 at this time is defined by the pair of second edge portions 14*g*, the pair of the second edge portions 16*g*, and the fixed aperture hole 20*a*.

FIG. 7C is a front view of the aperture mechanism 10 when each of the two aperture blades 14 and 16 is further approached to each other by a predetermined distance from the state of FIG. 7B. At this time, the pair of third edge portions 14*h* and the pair of third edge portions 16*h* are located inside the fixed aperture hole 20*a*. However, when the pair of third edge portions 14*h* and the pair of the third edge portions 16*h* first enter inside the fixed aperture hole 20*a*, among the boundaries constituting the light passage opening 50, the boundaries constituted of the second edge portions 14*g* and the second edge portions 16*g* are longer than the third edge portion 14*h* and the third edge portion 16*h*. Thus, the light passage opening 50 has a flat shape whose width in the vertical direction is larger than the width in the horizontal direction.

FIG. 7D is a front view of the aperture mechanism 10 when each of the two aperture blades 14 and 16 is further approached to each other by a predetermined distance from the state of FIG. 7C. When the two aperture blades 14 and 16 are further approached to each other, the flatness of the light passage opening 50 is gradually reduced, and the width in the vertical direction is equal to the width in the horizontal direction. FIG. 7D shows the state at this time.

At this time, among the boundaries constituting the light passage opening 50, the boundaries constituted of the second edge portion 14*g* and the second edge portion 16*g* have the same length as the third edge portion 14*h* and the third edge portion 16*h*. Accordingly, in the light passage opening 50, eight edge portions constituting the boundary have the same length, and since the eight edge portions form 135° with the adjacent edge portions, the light passage opening 50 is a regular octagon. The regular octagon is formed to be circumscribed with the virtual circle C1.

When the most frequently used F value is realized thus, the light passage opening 50 can have the shape closest to the virtual circle C1. It will be understood that the shape of the light passage opening 50 at this time is not limited to the regular octagon, and the shape may be an octagon other than the regular octagon, for example.

If the boundaries constituting the light passage opening 50 are constituted of curved lines, especially when outside is bright, an influence on image quality called "ghost" easily occurs. The boundaries of the light passage opening 50 are constituted thus, whereby the ghost can be suppressed.

The two aperture blades 14 and 16 may be formed so that the light passage opening 50 has the shape closest to the virtual circle C1 for example when an F value larger than the most frequently used F value is realized. According to this constitution, the flatness of the light passage opening 50 can be reduced when outside is bright, and the influence on image quality due to the flatness of the light passage opening 50 can be suppressed. The two aperture blades 14 and 16 may be formed so that the light passage opening 50 has the shape closest to the virtual circle C1 when an F value smaller than the most frequently used F value is realized.

FIG. 7E is a front view of the aperture stop mechanism 10 when the two aperture blades 14 and 16 are located at the minimum aperture position. When the two aperture blades 14 and 16 are further approached to each other from the state of FIG. 7D, the light passage opening 50 becomes flat so that the width in the horizontal direction is longer than the width in the vertical direction. Even when the two aperture blades 14 and 16 are located at the minimum aperture position thus, the light passage opening 50 has a flat shape. Even when the two aperture blades 14 and 16 reach the minimum aperture position thus, the light passage opening 50 surrounded by the boundary constituted of the eight straight lines is constituted of the edge portions of the two aperture blades 14 and 16.

For example when the light passage opening has a diamond shape surrounded by four straight lines, a blurred image of the background has a diamond shape for example when photographing is performed so that the background is defocused to make a subject prominent, so that the background image may become unnatural. As a result of the experiment performed by the inventor of the present invention, the boundaries of the light passage opening 50 are constituted of the eight straight lines when the two aperture blades 14 and 16 are located at the minimum aperture position, whereby it turns out that in comparison with a case where a diamond-shaped light passage opening is constituted of four straight lines, unnaturalness of a blurred image of the background can be substantially reduced. Accordingly, according to the aperture stop mechanism 10, the unnaturalness of the blurred image of the background and the ghost can be suitably suppressed.

In the light passage opening 50, the boundaries thereof may include not only straight lines but also curved lines. For example, a connecting portion of the pair of third edge portions 14h and a connecting portion of the pair of third edge portions 16h may be curved lines. Further, a connecting portion between the second edge portion 14g and the third edge portions 14h and a connecting portion between the second edge portion 16g and the third edge portions 16h may be curved lines.

In the first embodiment, when the F value to be realized is not more than a predetermined value, the drive mechanism 22 moves the two aperture blades 14 and 16 to the minimum aperture position. The predetermined value of the F value at this time is a value of not less than 5 and not more than 6.

An imaging apparatus such as a camera and a video mounted with the aperture stop mechanism 10 comprises an imaging device (not shown) such as a CCD (Charge Coupled Device) image sensor and a CMOS (Complementary Metal Oxide Semiconductor) image sensor and an electronic control unit (not shown) which adjusts storage time for exposing the imaging device to store electricity. The electronic control unit is constituted of microcomputer, ROM, RAM, and so on. The electronic control unit adjusts the storage time of the imaging device thus and thereby substantially adjusts the amount of light passing through the light passage opening 50 and utilized for imaging. Thus, the electronic control unit functions as light amount adjustment means 60. Such an exposure adjustment according to control of the imaging device is called an "electronic shutter". The imaging apparatus mounted with the aperture stop mechanism 10 has mechanical light amount adjustment means according to the aperture stop mechanism 10 and the electronic shutter.

The electronic control unit detects brightness of outside utilizing a detection signal from the imaging device. The electronic control unit sets the F value to be realized utilizing the detected brightness of outside. When the set F value is not more than a predetermined value, the drive mechanism 22 drives the two aperture blades 14 and 16 between the maximum aperture position and the minimum aperture position and adjusts an actual F value by means of the mechanical light amount adjustment means according to the aperture stop mechanism 10. When the set F value is larger than the predetermined value, the drive mechanism 22 moves the two aperture blades 14 and 16 to the minimum aperture position and avoids further adjustment of the F value in the mechanical light amount adjustment means according to the aperture stop mechanism 10. At this time, the electronic control unit adjusts the storage time of the imaging device so as to substantially realize the F value set larger than the predetermined value. The aperture stop mechanism 10 as the mechanical light amount adjustment means and the electronic shutter are used in combination, whereby this constitution can correspond to a large F value while suppressing the flatness ratio of the light passage opening 50 at the minimum aperture position.

Figure 8:
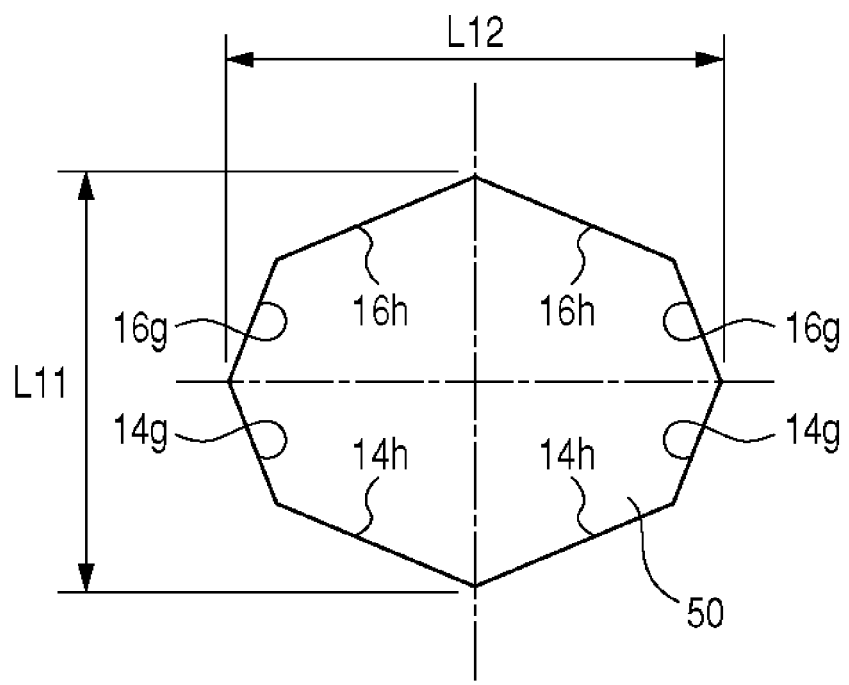
FIG. 8 is a view showing the shape of the light passage opening when the two aperture blades are located at a minimum aperture position.

FIG. 8 is a view showing the shape of the light passage opening 50 when the two aperture blades 14 and 16 are located at the minimum aperture position. At this time, the width in the horizontal direction of the light passage opening 50 is maximum. The two aperture blades 14 and 16 are each formed so that the flatness ratio of the light passage opening 50 obtained by dividing a horizontal direction length L12 at this time by a vertical direction length L11 is more than 1 and not more than 1.4. As a result of the experiment performed by the inventor of the present invention, the flatness ratio of the light passage opening 50 is set to such a value when the two aperture blades 14 and 16 are located at the minimum aperture position, whereby it turns out that while the unnaturalness of the blurred image of the background is suppressed, smear and so on are suppressed even if a large F value is set, and smooth switching to the electronic shutter can be performed.

Second Embodiment

Figure 9:
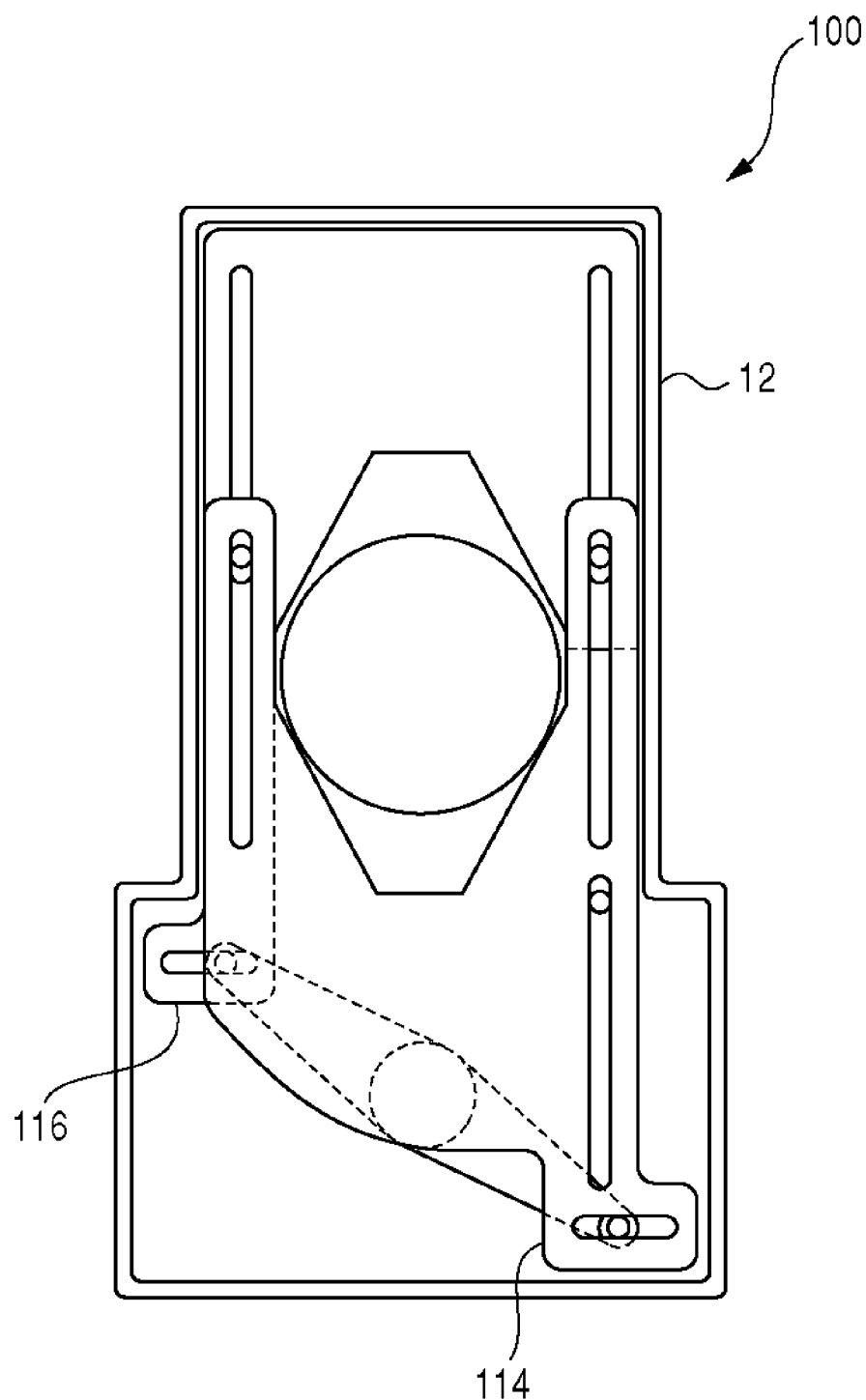
FIG. 9 is a front view of an aperture stop mechanism according to a second embodiment.

FIG. 9 is a front view of an aperture stop mechanism 100 according to the second embodiment. Unless particularly referred to, the configurations of the aperture stop mechanism 100 and an imaging apparatus mounted with the aperture stop mechanism 100 are similar to those of the first embodiment. Hereinafter, components similar to those in the first embodiment are denoted by the same reference numerals, and descriptions thereof are omitted.

The aperture stop mechanism 100 has a base unit 12 and two aperture blades 114 and 116. The two aperture blades 114 and 116 are provided movable in a vertical direction so as to be spaced apart from and approached to each other.

Figure 10:
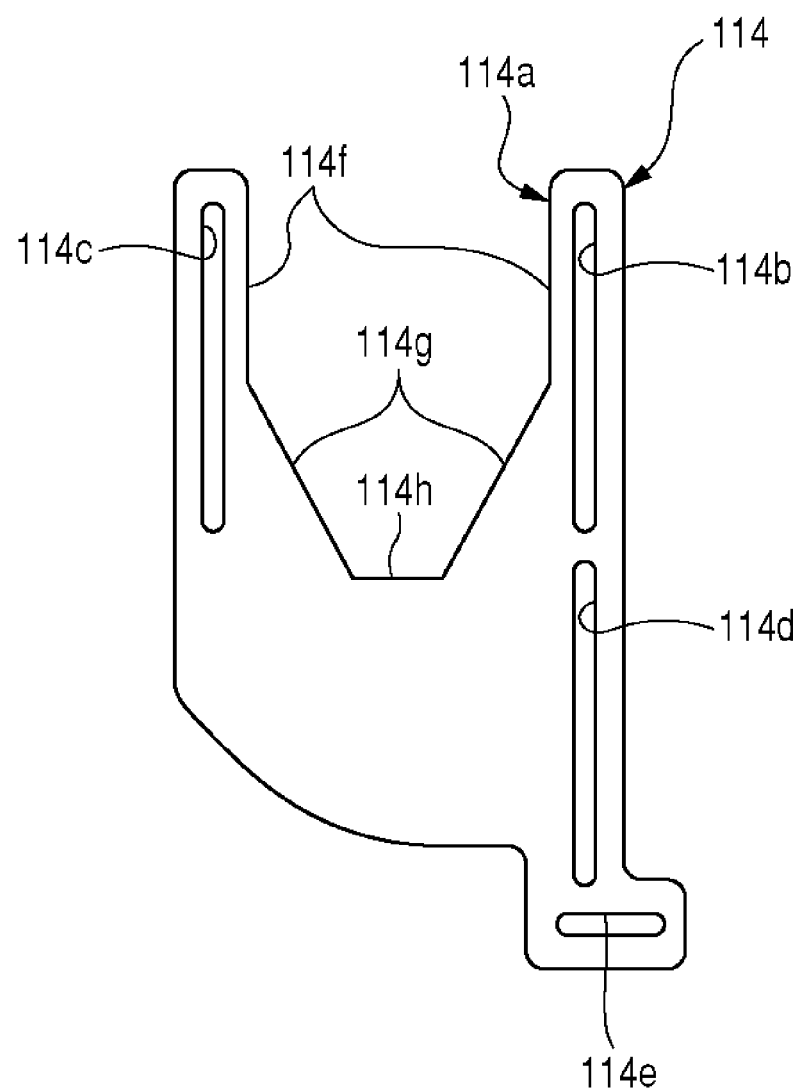
FIG. 10 is a front view of an aperture blade.

FIG. 10 is a front view of an aperture blade 114. The aperture blade 114 is formed into a plate shape having a recess 114a formed so as to be incised. The aperture blade 114 has long guide holes 114b, 114c, and 114d and a connecting hole 114e. However, the shape and arrangement are similar to those of the guide holes 14b, 14c, and 14d and the connecting hole 14e according to the first embodiment. A pair of first edge portions 114f is formed similarly to the pair of first edge portions 14f.

The recess 114a is provided between the guide holes 114b and 114c. The recess 114a includes a pair of second edge portions 114g and a pair of third edge portions 114h. The second edge portions 114g as a pair are each formed linearly and have the same length, and each one end is connected to each of the pair of first edge portions 114f. Each of the pair of second edge portions 114g is inclined at a predetermined angle with respect to the vertical direction so as to approach to each other as they approach the other end. The third edge portion 114h is formed extending in the horizontal direction, and the both ends are connected to the respective other ends of the second edge portions 114g as a pair. Thus, the recess 114a is formed symmetrically around a line passing through the midpoint of the third edge portion 114h and parallel to the vertical direction.

Figure 11:
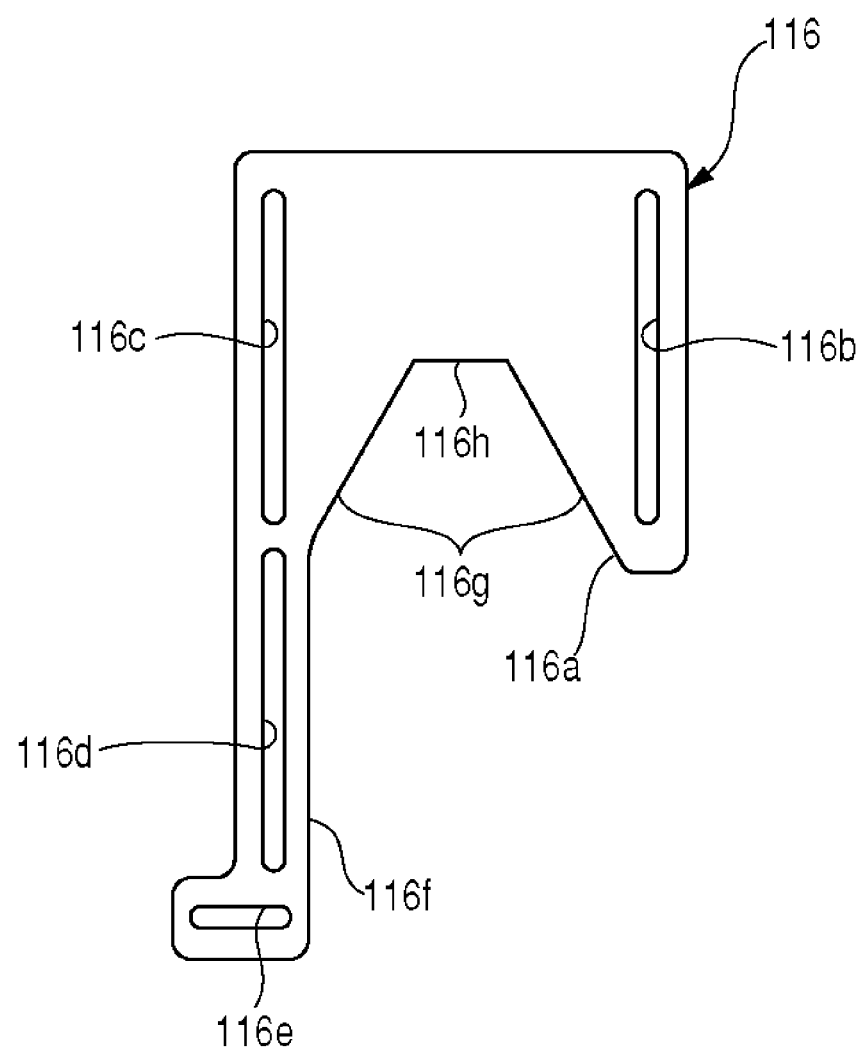
FIG. 11 is a front view of an aperture blade.

FIG. 11 is a front view of the aperture blade 116. The aperture blade 116 is formed into a plate shape having a recess 116a formed so as to be incised. The aperture blade 116 has long guide holes 116b, 116c, and 116d and a connecting hole 116e. The shape and arrangement of the guide holes 116b, 116c, 116d and the connecting hole 116e are similar to those of the guide holes 14b, 14c, and 14d and the connecting hole 14e according to the first embodiment. The first edge portion 116f is formed similarly to the pair of first edge portions 16f.

The recess 116a is provided between the guide holes 116b and 116c. The recess 116a includes a pair of second edge portions 116g and a third edge portion 116h.

In one of the pair of second edge portions 116g, its one end is connected to an end of the first edge portion 116f. The second edge portions 116g as a pair are formed linearly, have the same length, and are inclined at a predetermined angle with respect to the vertical direction so as to approach to each other as they approach the other end. The third edge portion 116h is formed extending in the horizontal direction, and the both ends are connected to the respective other ends of the second edge portions 116g as a pair. Thus, the recess 116a is formed symmetrically around a line passing through the midpoint of the third edge portion 116h and parallel to the vertical direction.

Figure 12:
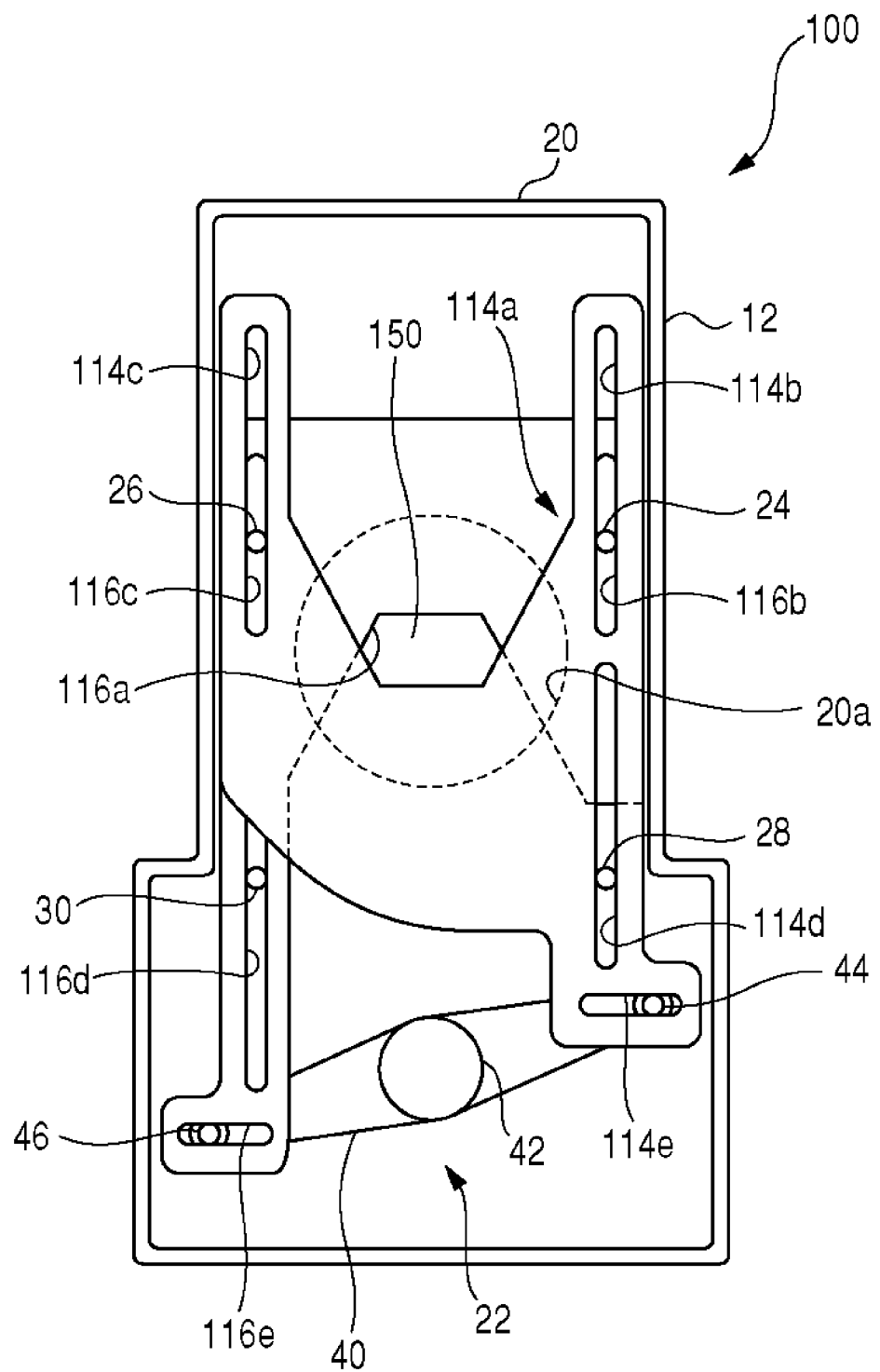
FIG. 12 is a front view of an aperture stop mechanism when the two aperture blades are attached to a base unit.

FIG. 12 is a front view of the aperture stop mechanism 10 when the two aperture blades 114 and 116 are attached to the base unit 12. A method of attaching the two aperture blades 114 and 116 to the base unit 12 is similar to the method of attaching the two aperture blades 14 and 16. When the two aperture blades 114 and 116 are attached to the base unit 12, the recesses 114a and 116a are opened to face each other. Thus, in the two aperture blades 114 and 116, a single light passage opening 150 into which light utilized in imaging is introduced is constituted of both the recesses 114a and 116a as the respective edge portions of the two aperture blades 114 and 116. A drive mechanism 22 swings a swing rod 40 to thereby drive the two aperture blades 114 and 116 in directions opposite to each other in parallel with the vertical direction so that the aperture blades 114 and 116 are approached to and spaced apart from each other, so that the aperture area of the light passage opening 150 is changed.

Figure 13B:
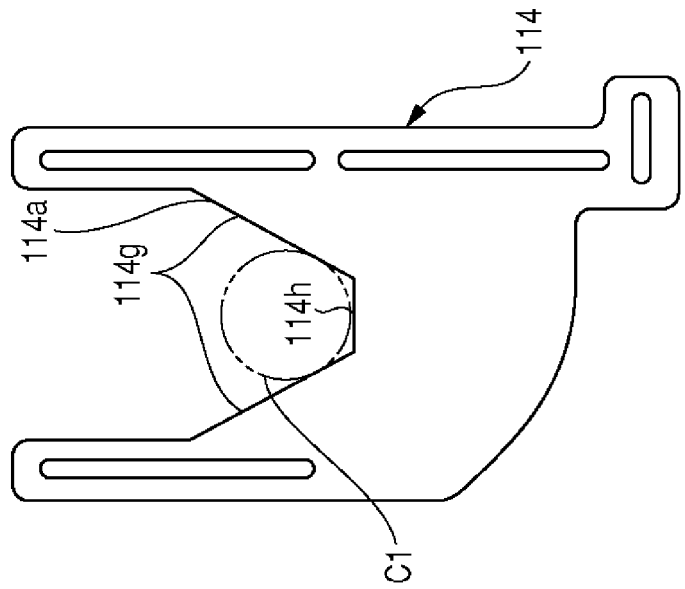
FIGS. 13A and 13B are views showing a method of determining a shape of a recess.
Figure 13A:
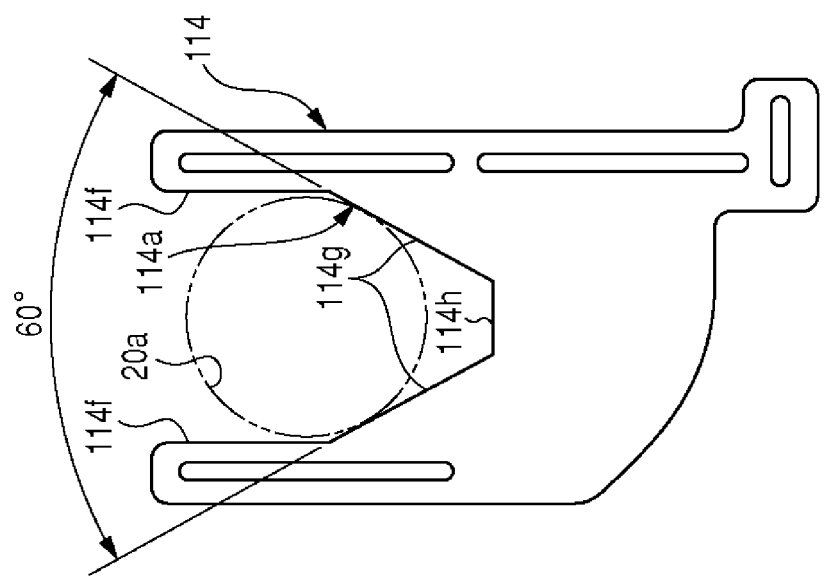

FIG. 13A is a view showing a method of determining the shape of the recess 114a. The pair of first edge portions 114f is formed so that an interval between the first edge portions 114f is the same as or slightly larger than a fixed aperture hole 20a. The pair of second edge portions 114g is formed so that the second edge portions 114g form 60°. Accordingly, the pair of second edge portions 114g is each inclined at 30° with respect to the vertical direction. The pair of second edge portions 114g is each provided at a position circumscribed with the fixed aperture hole 20a when the aperture blade 114 is located at the maximum aperture position.

As with FIG. 13A, FIG. 13B is a view showing the method of determining the shape of the recess 114a. A virtual circle C1 having the aperture area for realizing the most frequently used F value is inscribed with the pair of second edge portions 114g determined in FIG. 13A.

The third edge portion 114h is formed to be circumscribed with the virtual circle C1 while extending in the horizontal direction. Thus, each shape of the pair of first edge portions 114f, the pair of second edge portions 114g, and the pair of third edge portions 114h is determined.

The recess 116a is formed into the same shape as the recess 114a except that the opening direction is opposite. Accordingly, the pair of second edge portions 116g is inclined at 30° with respect to the vertical direction, and the third edge portion 116h is formed extending in the horizontal direction. The pair of second edge portions 116g is similar to the pair of second edge portions 114g in that the pair of second edge portions 116g is provided to be circumscribed with the fixed aperture hole 20a when the aperture blade 116 is located at the maximum aperture position. The recess 116a may be formed into a shape different from the recess 114a.

FIGS. 14A to 14E are views showing a change of the shape of the light passage opening 150 when the two aperture blades 114 and 116 are approached to each other. For ease of understanding, each shape of the two aperture blades 114 and 116 is schematically shown.

FIG. 14A is a front view of the aperture stop mechanism 10 when the two aperture blades 114 and 116 are located at the maximum aperture position to which the two aperture blades 114 and 116 move the most so that the light amount passing through the light passage opening 50 is maximum. When the two aperture blades 114 and 116 are located at the maximum aperture position, light shielding of the fixed aperture hole 20a according to the two aperture blades 114 and 116 is completely released. Thus, the aperture area of the light passage opening 150 is the aperture area of the fixed aperture hole 20a.

FIG. 14B is a front view of the aperture mechanism 10 when the two aperture blades 114 and 116 are approached to each other by a predetermined distance from the maximum aperture position. In this state, a portion of the pair of second edge portions 114g and a portion of the pair of the second edge portions 116g are located inside the fixed aperture hole 20a, and a part of light to be passed through the fixed aperture hole 20a is shielded. However, the third edge portion 114h and the third edge portion 116h remain located outside the fixed aperture hole 20a. Thus, the light passage opening 50 at this time is defined by the pair of second edge portions 114g, the pair of the second edge portions 116g, and the fixed aperture hole 20a.

FIG. 14C is a front view of the aperture mechanism 10 when the two aperture blades 114 and 116 are further approached to each other by a predetermined distance from the state of FIG. 14B. At this time, the third edge portion 114*h* and the third edge portion 116*h* are located inside the fixed aperture hole 20*a*. However, when the third edge portion 114*h* and the third edge portion 116*h* first enter inside the fixed aperture hole 20*a*, among the boundaries constituting the light passage opening 150, the boundaries constituted of the second edge portions 114*g* and the second edge portions 116*g* are longer than the third edge portion 114*h* and the third edge portion 116*h*. Thus, the light passage opening 150 has a flat shape whose width in the vertical direction is larger than the width in the horizontal direction.

FIG. 14D is a front view of the aperture mechanism 10 when the two aperture blades 114 and 116 are further approached to each other by a predetermined distance from the state of FIG. 14C. When the two aperture blades 114 and 116 are further approached to each other, the flatness of the light passage opening 150 is gradually reduced, and the light passage opening 150 has a shape circumscribed with a virtual circle C1. FIG. 14D shows the state at this time.

At this time, among the boundaries constituting the light passage opening 150, the boundaries constituted of the second edge portion 114*g* and the second edge portion 116*g* have the same length as the third edge portion 114*h* and the third edge portion 116*h*. Accordingly, in the light passage opening 150, six edge portions constituting the boundary have the same length, and since the six edge portions form 120° with the adjacent edge portions, the light passage opening 150 is a regular hexagon. The regular hexagon is formed to be circumscribed with the virtual circle C1.

When the most frequently used F value is realized thus, the light passage opening 150 can have the shape closest to the virtual circle C1. It will be understood that the shape of the light passage opening 150 at this time is not limited to the regular hexagon, and the shape may be a hexagon other than the regular hexagon, for example.

The two aperture blades 114 and 116 may be formed so that the light passage opening 150 has the shape closest to the virtual circle C1 when an F value larger than the most frequently used F value is realized, for example. The two aperture blades 114 and 116 may be formed so that the light passage opening 150 has the shape closest to the virtual circle C1 when an F value smaller than the most frequently used F value is realized.

FIG. 14E is a front view of the aperture stop mechanism 10 when the two aperture blades 114 and 116 are located at the minimum aperture position. When the two aperture blades 114 and 116 are further approached to each other from the state of FIG. 14D, the light passage opening 150 becomes flat so that the width in the horizontal direction is longer than the width in the vertical direction. When the two aperture blades 114 and 116 are located at the minimum aperture position, the light passage opening 150 has a flat shape.

The two aperture blades 114 and 116 are provided so as to form the light passage opening 150, surrounded by the boundaries including six straight lines, with the edge portions of the two aperture blades 114 and 116 when the two aperture blades 114 and 116 reach the minimum aperture position. As a result of the experiment performed by the inventor of the present invention, the boundaries of the light passage opening 150 are constituted of the six straight lines when the two aperture blades 114 and 116 are located at the minimum aperture position, whereby it turns out that in comparison with a case where a diamond-shaped light passage opening is constituted of four straight lines, unnaturalness of a so-called blurred image of the background can be substantially reduced.

In the light passage opening 150, the boundaries thereof may include not only straight lines but also curved lines. For example, a connecting portion between the second edge portion 114*g* and the third edge portions 114*h* and a connecting portion between the second edge portion 116*g* and the third edge portions 116*h* may be curved lines.

Even in the second embodiment, when the set F value is larger than the predetermined value, the drive mechanism 22 moves the two aperture blades 114 and 116 to the minimum aperture position and avoids further adjustment of the F value in the mechanical light amount adjustment means according to the aperture stop mechanism 100. At this time, the electronic control unit adjusts the storage time of the imaging device so as to substantially realize the F value set larger than the predetermined value.

Figure 15:
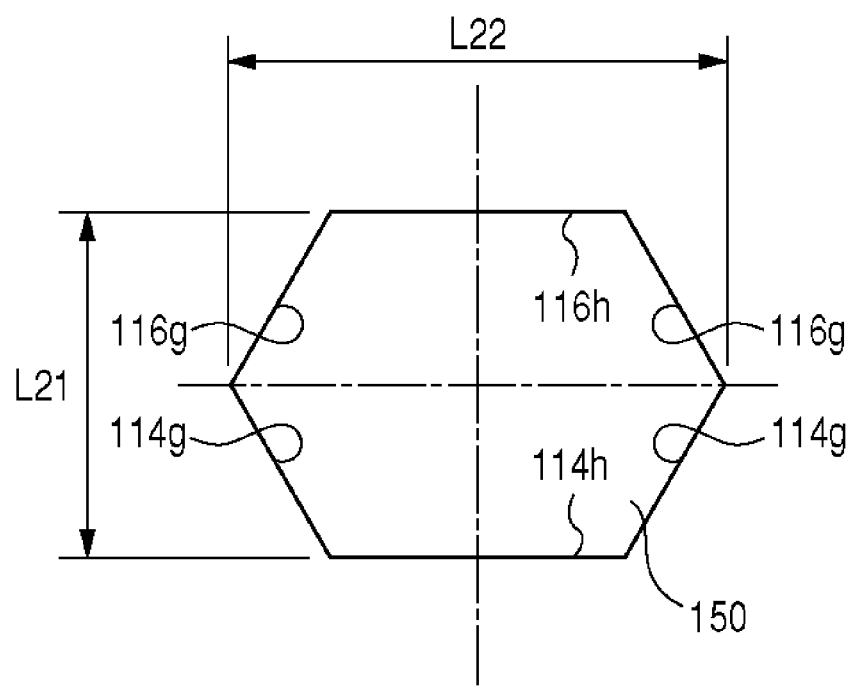
FIG. 15 is a view showing the shape of the light passage opening when the two aperture blades are located at the minimum aperture position.

FIG. 15 is a view showing the shape of the light passage opening 150 when the two aperture blades 114 and 116 are located at the minimum aperture position. At this time, the width in the vertical direction of the light passage opening 150 is minimum, and the width in the horizontal direction is maximum. The two aperture blades 114 and 116 are each formed so that the flatness ratio of the light passage opening 150 obtained by dividing a horizontal direction length L22 at this time by a vertical direction length L21 is more than 1 and not more than 1.4. The flatness ratio of the light passage opening 150 is set to such a value, whereby while unnaturalness of blur of the background is suppressed, smooth switching to the electronic shutter can be performed.

Third Embodiment

Figure 16:
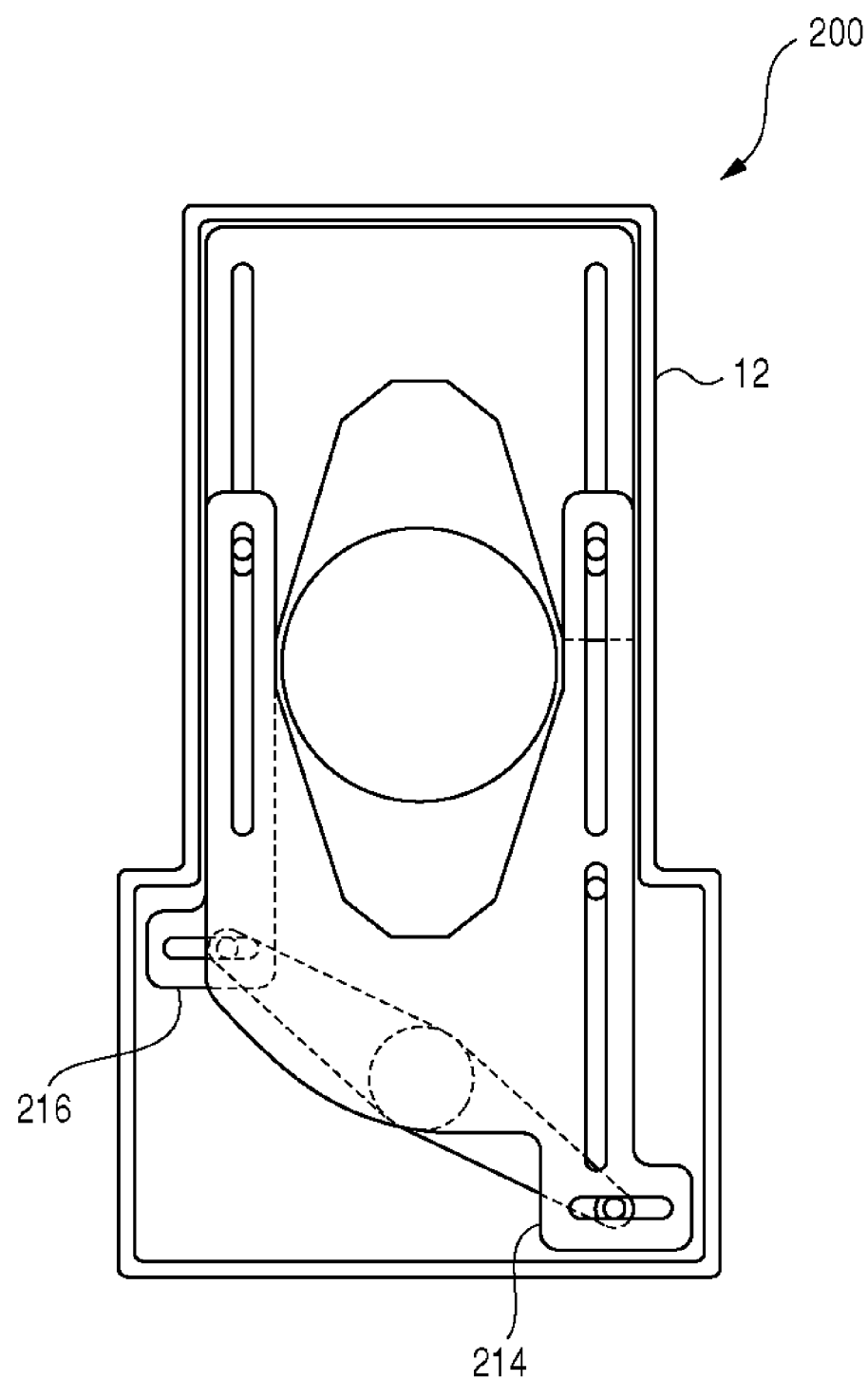
FIG. 16 is a front view of an aperture stop mechanism according to a third embodiment.

FIG. 16 is a front view of an aperture stop mechanism 200 according to the third embodiment. Unless particularly referred to, the configurations of the aperture stop mechanism 200 and an imaging apparatus mounted with the aperture stop mechanism 200 are similar to those of the first embodiment. Hereinafter, components similar to those in the above embodiments are denoted by the same reference numerals, and descriptions thereof are omitted.

The aperture stop mechanism 200 has a base unit 12 and two aperture blades 214 and 216. The two aperture blades 214 and 216 are provided movable in a vertical direction so as to be spaced apart from and approached to each other.

Figure 17:
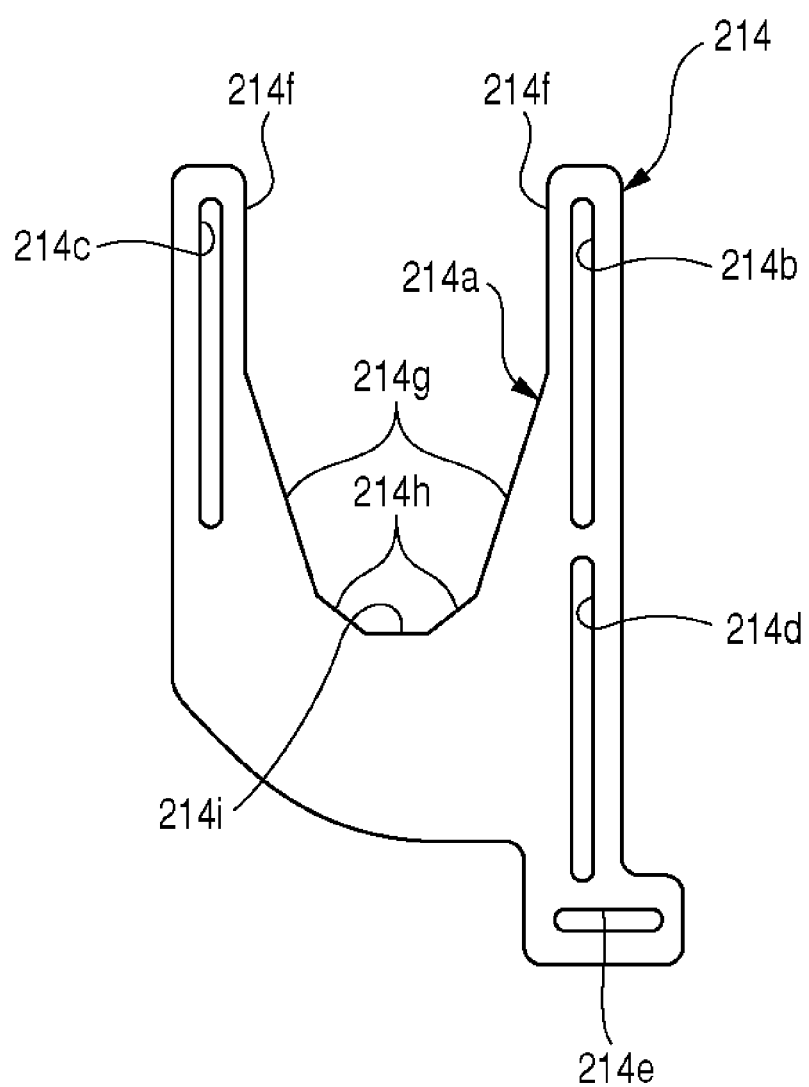
FIG. 17 is a front view of an aperture blade.

FIG. 17 is a front view of the aperture blade 214. The aperture blade 214 is formed into a plate shape having a recess 214*a* formed so as to be incised. The aperture blade 214 has long guide holes 214*b*, 214*c*, and 214*d* and a connecting hole 214*e*. However, the shape and arrangement are similar to those of the guide holes 14*b*, 14*c*, and 14*d* and the connecting hole 14*e* according to the first embodiment. A pair of first edge portions 214*f* is formed similarly to the pair of first edge portions 14*f*.

The recess 214*a* is provided between the guide holes 214*b* and 214*c*. The recess 214*a* includes a pair of second edge portions 214*g*, a pair of third edge portions 214*h*, and a fourth edge portion 214*i*.

The second edge portions 214*g* as a pair are each formed linearly and have the same length, and each one end is connected to each end of the pair of first edge portions 214*f*. Each of the pair of second edge portions 214*g* is inclined at a predetermined angle with respect to the vertical direction so as to approach to each other as they approach to the other end. The third edge portions 214*h* as a pair are each formed linearly and have the same length, and each one end is connected to the other end of each of the pair of second edge portions 214*g*. Each of the pair of third edge portions 214*h* is inclined at a predetermined angle with respect to the vertical direction so as to approach each other as they approach the other end. At this time, the inclination angle of the third edge portion 214h with respect to the vertical direction is larger than the inclination angle of the second edge portion 214g with respect to the vertical direction. The fourth edge portions 214i is formed extending in the horizontal direction, and the both ends are connected to the respective other ends of the third edge portions 214h as a pair. Thus, the recess 214a is formed symmetrically around a line passing through the midpoint of the fourth edge portion 214i and parallel to the vertical direction.

Figure 18:
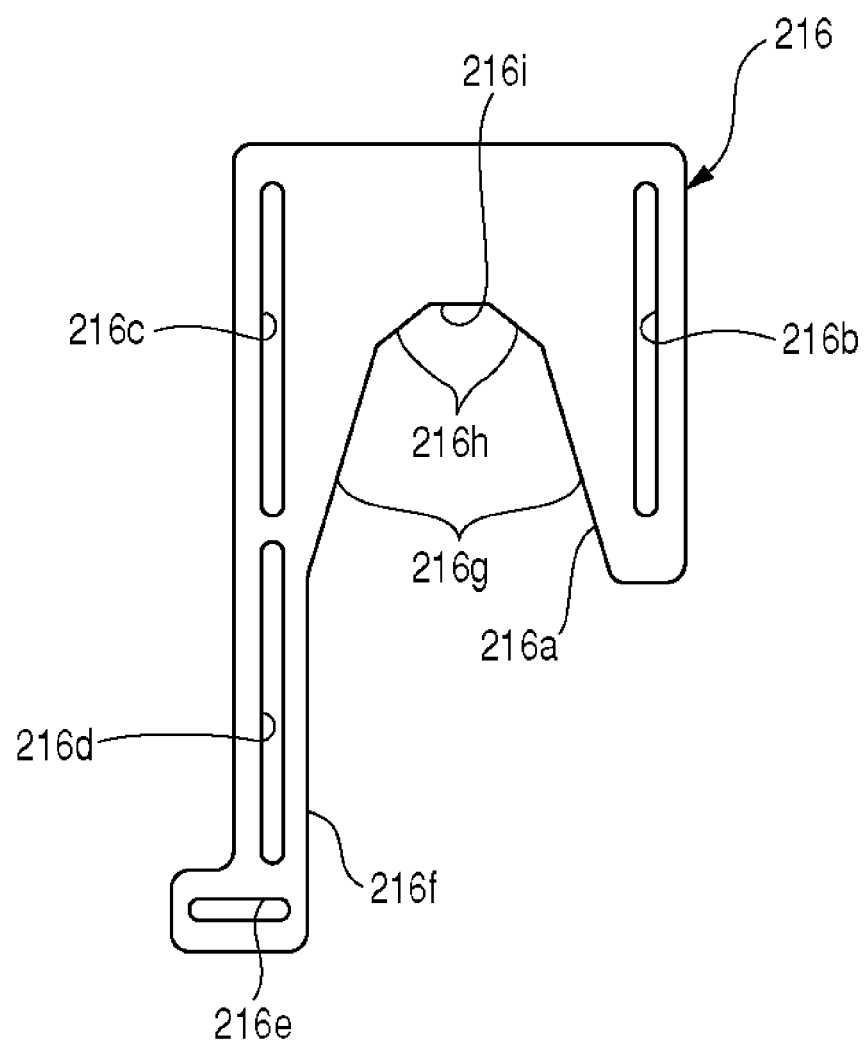
FIG. 18 is a front view of an aperture blade.

FIG. 18 is a front view of the aperture blade 216. The aperture blade 216 is formed into a plate shape having a recess 216a formed so as to be incised. The aperture blade 216 has long guide holes 216b, 216c, and 216d and a connecting hole 216e. However, the shape and arrangement are similar to those of the guide holes 14b, 14c, and 14d and the connecting hole 14e according to the first embodiment. The first edge portion 216f is formed similarly to the pair of first edge portions 16f.

The recess 216a is provided between the guide holes 216b and 216c. The recess 216a includes a pair of second edge portions 216g and the fourth edge portion 216i.

In one of the pair of second edge portions 216g, its one end is connected to an end of the first edge portion 216f. The second edge portions 216g as a pair are each formed linearly, have the same length, and are inclined at a predetermined angle with respect to the vertical direction so as to approach to each other as they approach to the other end. The third edge portions 216h as a pair are each formed linearly and have the same length, and each one end is connected to the other end of each of the pair of the second edge portions 216g. Each of the pair of third edge portions 216h is inclined at a predetermined angle with respect to the vertical direction so as to approach to each other as they approach to the other end. At this time, the inclination angle of the third edge portion 216h with respect to the vertical direction is larger than the inclination angle of the second edge portion 216g with respect to the vertical direction. The fourth edge portion 216i is formed extending in the horizontal direction, and the both ends are connected to the respective other ends of the third edge portions 216h as a pair. Thus, the recess 216a is formed symmetrically around a line passing through the midpoint of the fourth edge portion 216i and parallel to the vertical direction.

Figure 19:
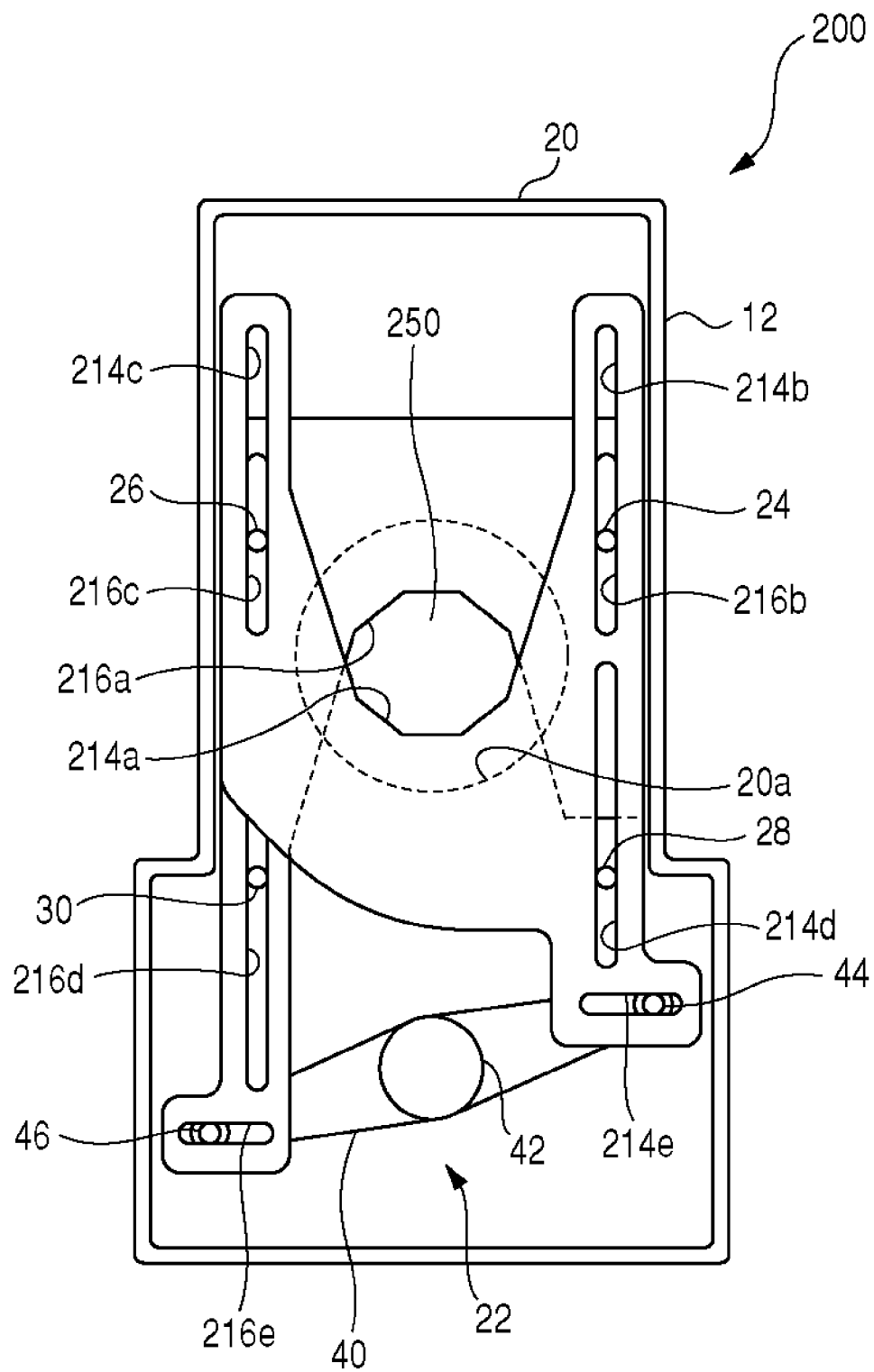
FIG. 19 is a front view of the aperture stop mechanism when the two aperture blades are attached to a base unit.

FIG. 19 is a front view of the aperture stop mechanism 10 when the two aperture blades 214 and 216 are attached to abase unit 12. A method of attaching the two aperture blades 214 and 216 to the base unit 12 is similar to the method of attaching the two aperture blades 14 and 16. When the two aperture blades 214 and 216 are attached to the base unit 12, the recesses 214a and 216a are opened to face each other. Thus, in the two aperture blades 214 and 216, a single light passage opening 250 into which light utilized in imaging is introduced is constituted of both the recesses 214a and 216a as the respective edge portions of the two aperture blades 214 and 216. A drive mechanism 22 swings a swing rod 40 to thereby drive the two aperture blades 114 and 116 in directions opposite to each other in parallel with the vertical direction so that the aperture blades 114 and 116 are approached to and spaced apart from each other, so that the aperture area of the light passage opening 250 is changed.

Figure 20B:
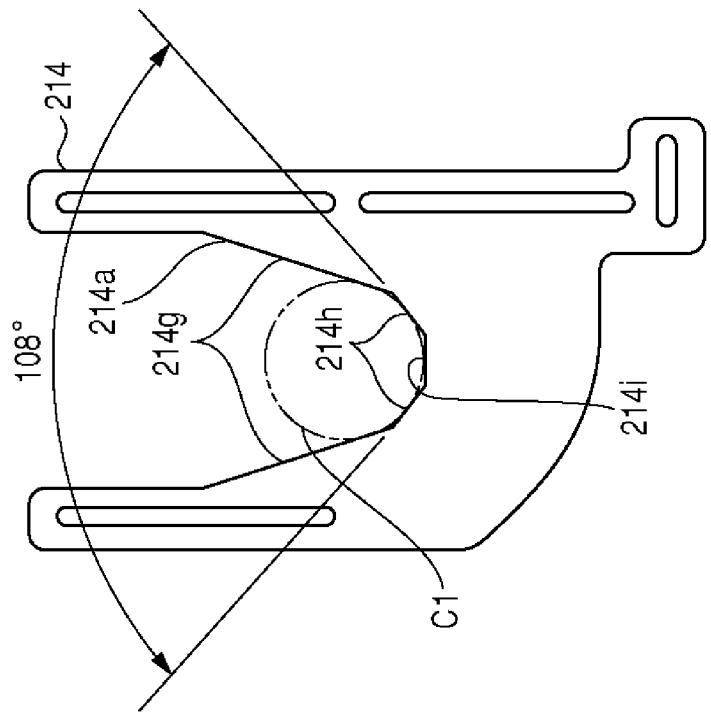
FIGS. 20A and 20B are views showing a method of determining a shape of a recess.
Figure 20A:
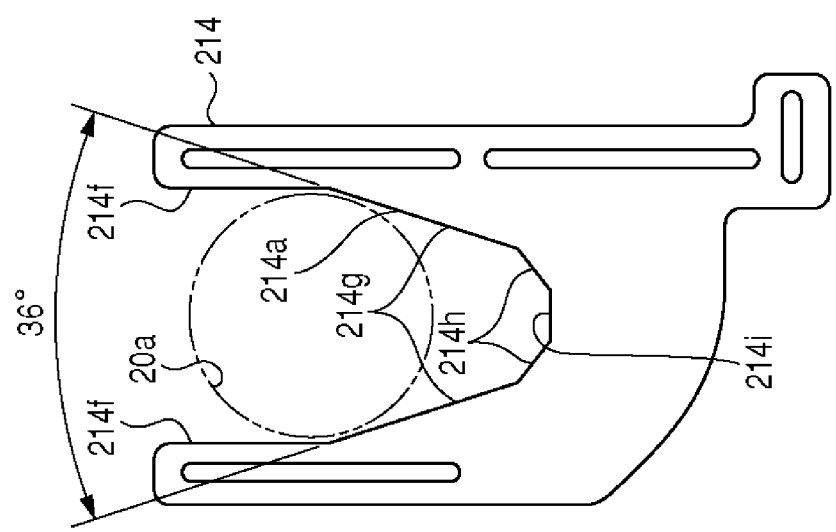

FIG. 20A is a view showing a method of determining the shape of the recess 214a. The pair of first edge portions 214f is formed so that an interval between the first edge portions 214f is the same as or slightly larger than a fixed aperture hole 20a. The pair of second edge portions 214g is formed so that the second edge portions 214g form 36°. Accordingly, the pair of second edge portions 214g is each inclined at 18° with respect to the vertical direction. The pair of second edge portions 214g is each provided at a position circumscribed with the fixed aperture hole 20a when the aperture blade 214 is located at the maximum aperture position.

As with FIG. 20A, FIG. 20B is a view showing the method of determining the shape of the recess 214a. A virtual circle C1 having the aperture area for realizing the most frequently used F value is inscribed with the pair of second edge portions 214g determined in FIG. 20A.

The pair of third edge portions 214h is formed so that the third edge portions 214h form 108°. Accordingly, the pair of third edge portions 214h is each inclined at 54° with respect to the vertical direction and formed so that the third edge portions 214h and the second edge portion 214g form an interior angle of 144°. The pair of third edge portions 214h is each formed to be circumscribed with the virtual circle C1. The fourth edge portion 214i is formed to be circumscribed with the virtual circle C1 while extending in the horizontal direction. Since the pair of third edge portions 214h and the fourth edge portion 214i are circumscribed with the same virtual circle C1 thus, the third edge portions 214h as a pair and the fourth edge portion 214i have the same length. Thus, each shape of the pair of first edge portions 214f, the pair of second edge portions 214g, the pair of third edge portions 214h, and the fourth edge portion 214i is determined.

The recess 216a is formed into the same shape as the recess 214a except that the opening direction is opposite. Accordingly, the pair of second edge portions 216g is each inclined at 18° with respect to the vertical direction, the pair of third edge portions 216h is each inclined at 54° with respect to the vertical direction, and the fourth edge portion 216i is formed extending in the horizontal direction. The third edge portions 216h as a pair and the fourth edge portion 216i have the same length. The pair of second edge portions 216g is similar to the pair of second edge portions 214g in that the pair of second edge portions 216g is provided to be circumscribed with the fixed aperture hole 20a when the aperture blade 216 is located at the maximum aperture position. The recess 216a may be formed into a shape different from the recess 214a.

FIGS. 21A to 21E are views showing a change of the shape of the light passage opening 250 when the two aperture blades 214 and 216 are approached to each other. For ease of understanding, each shape of the two aperture blades 214 and 216 is schematically shown.

FIG. 21A is a front view of the aperture stop mechanism 10 when the two aperture blades 214 and 216 are located at the maximum aperture position to which the two aperture blades 214 and 216 move the most so that the light amount passing through the light passage opening 50 is maximum. When the two aperture blades 214 and 216 are located at the maximum aperture position, light shielding of the fixed aperture hole 20a according to the two aperture blades 214 and 216 is completely released. Thus, the aperture area of the light passage opening 250 is the aperture area of the fixed aperture hole 20a.

FIG. 21B is a front view of the aperture mechanism 10 when the two aperture blades 214 and 216 are approached to each other by a predetermined distance from the maximum aperture position. In this state, a portion of the pair of second edge portions 214g and a portion of the pair of the second edge portions 216g are located inside the fixed aperture hole 20a, and a part of light to be passed through the fixed aperture hole 20a is shielded. However, the third edge portion 214h, the fourth edge portion 214i, the third edge portion 216h, and the fourth edge portion 216i remain located outside the fixed aperture hole 20a. Thus, the light passage opening 50 at this time is defined by the pair of second edge portions 214g, the pair of second edge portions 216g, and the fixed aperture hole 20a.

FIG. 21C is a front view of the aperture mechanism 10 when the two aperture blades 214 and 216 are further approached to each other by a predetermined distance from the state of FIG. 21B. At this time, the third edge portion 214h, the fourth edge portion 214i, the third edge portion 216h, and the fourth edge portion 216i are located inside the fixed aperture hole 20a. However, when the third edge portion 214h, the fourth edge portion 214i, the third edge portion 216h, and the fourth edge portion 216i first enter inside the fixed aperture hole 20a, among the boundaries constituting the light passage opening 250, the boundaries constituted of the second edge portions 214g and the second edge portions 216g are longer than the third edge portion 214h and so on. Thus, the light passage opening 250 has a flat shape whose width in the vertical direction is larger than the width in the horizontal direction.

FIG. 21D is a front view of the aperture mechanism 10 when the two aperture blades 214 and 216 are further approached to each other by a predetermined distance from the state of FIG. 21C. When the two aperture blades 214 and 216 are further approached to each other, the flatness of the light passage opening 250 is gradually reduced, and the light passage opening 250 has a shape circumscribed with a virtual circle C1. At this time, the width in the vertical direction of the light passage opening 250 is the same as the width in the horizontal direction, and the flatness ratio is minimum. FIG. 21D shows the state at this time.

At this time, among the boundaries constituting the light passage opening 250, the boundaries constituted of the second edge portion 214g and the second edge portion 216g have the same length as the third edge portion 214h and so on. Accordingly, in the light passage opening 250, ten edge portions constituting the boundary have the same length, and since the ten edge portions form 144° with the adjacent edge portions, the light passage opening 250 is a regular decagon. The regular decagon is formed to be circumscribed with the virtual circle C1.

When the most frequently used F value is realized thus, the light passage opening 250 can have the shape closest to the virtual circle C1. It will be understood that the shape of the light passage opening 250 at this time is not limited to the regular decagon, and the shape may be a decagon other than the regular decagon, for example.

The two aperture blades 214 and 216 may be formed so that the light passage opening 250 has the shape closest to the virtual circle C1 for example when an F value larger than the most frequently used F value is realized. The two aperture blades 214 and 216 may be formed so that the light passage opening 250 has the shape closest to the virtual circle C1 when an F value smaller than the most frequently used F value is realized.

FIG. 21E is a front view of the aperture stop mechanism 10 when the two aperture blades 214 and 216 are located at the minimum aperture position. When the two aperture blades 214 and 216 are further approached to each other from the state of FIG. 21D, the light passage opening 250 becomes flat so that the width in the horizontal direction is longer than the width in the vertical direction. When the two aperture blades 214 and 216 are located at the minimum aperture position thus, the light passage opening 250 has a flat shape.

Even when the two aperture blades 214 and 216 reach the minimum aperture position, the light passage opening 250 surrounded by the boundaries including ten straight lines is constituted of the edge portions of the two aperture blades 214 and 216. As a result of the experiment performed by the inventor of the present invention, the boundaries of the light passage opening 250 are constituted of the ten straight lines when the two aperture blades 214 and 216 are located at the minimum aperture position, whereby it turns out that in comparison with a case where a diamond-shaped light passage opening is constituted of four straight lines, unnaturalness of a so-called blurred image of the background can be substantially reduced.

In the light passage opening 250, the boundaries thereof may include not only straight lines but also curved lines. For example, a connecting portion between the second edge portion 214g and the fourth edge portion 214i and a connecting portion between the second edge portion 216g and the fourth edge portion 216i may be curved lines.

Even in the third embodiment, when the set F value is larger than the predetermined value, the drive mechanism 22 moves the two aperture blades 214 and 216 to the minimum aperture position and avoids further adjustment of the F value in the mechanical light amount adjustment means according to the aperture stop mechanism 200. At this time, the electronic control unit adjusts the storage time of the imaging device so as to substantially realize the F value set larger than the predetermined value.

Figure 22:
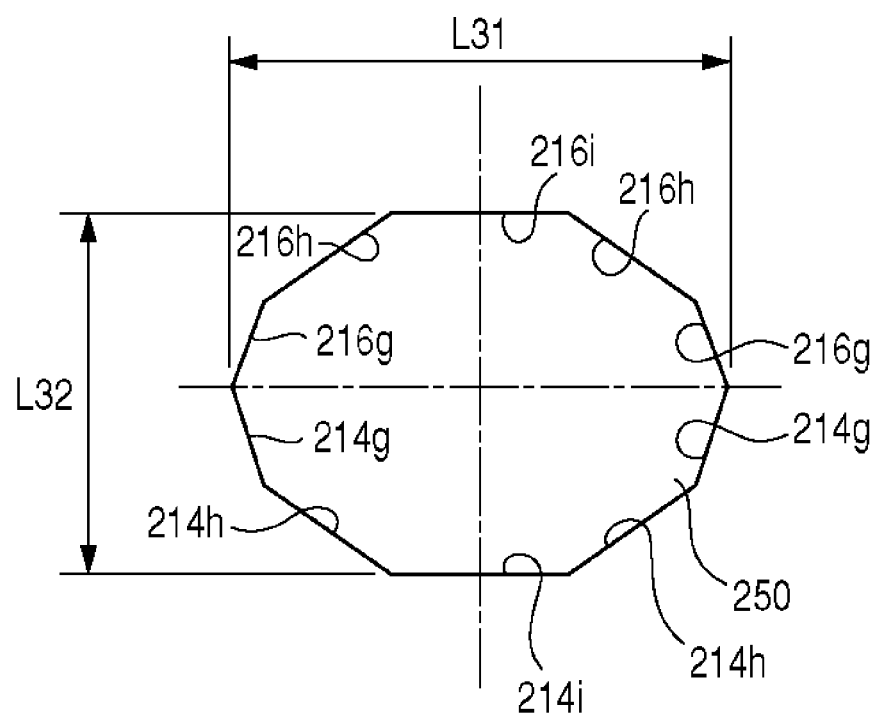
FIG. 22 is a view showing the shape of the light passage opening when the two aperture blades are located at the minimum aperture position.

FIG. 22 is a view showing the shape of the light passage opening 250 when the two aperture blades 214 and 216 are located at the minimum aperture position. At this time, the width in the vertical direction of the light passage opening 250 is minimum, and the width in the horizontal direction is maximum. The two aperture blades 214 and 216 are each formed so that the flatness ratio of the light passage opening 250 obtained by dividing a horizontal direction length L32 at this time by a vertical direction length L31 is more than 1 and not more than 1.4. The flatness ratio of the light passage opening 250 is set to such a value, whereby while unnaturalness of blur of the background is suppressed, smooth switching to the electronic shutter can be performed.

The present invention is not limited to the above embodiments, and a suitable combination of the components of the above embodiments is effective as an embodiment of the present invention. Modifications such as various design changes may be added to each embodiment based on the knowledge of those skilled in the art, and the embodiment to which the modifications are added is also included in the range of the invention.

In a certain variation, two aperture blades are provided so as to form a single light passage opening, surrounded by boundaries including five or more straight lines, with the respective edge portions of the two aperture blades. For example, the two aperture blades may be provided so as to form the single light passage opening, surrounded by boundaries including five straight lines, with the respective edge portions of the two aperture blades or may be provided so as to form the single light passage opening, surrounded by boundaries including seven straight lines, with the respective edge portions of the two aperture blades. The single light passage opening surrounded by boundaries including five or more straight lines is constituted of the respective edge portions of the two aperture blades, whereby in comparison with the case where a light passage opening surrounded by a diamond-shaped boundary comprising four straight lines, unnaturalness of a blurred image of the background can be suppressed.

Also in this case, the two aperture blades may be provided so as to form the single light passage opening, surrounded by boundaries including five or more straight lines, with the respective edge portions of the two aperture blades when the two aperture blades are located at the minimum aperture position. When the two aperture blades are located at the minimum aperture position, the electronic control unit may adjust the amount of light utilized in imaging by adjusting the storage time of the imaging device.

In another variation, an ND (Neutral Density) filter is provided instead of an electronic shutter. Also in this case, the ND filter is provided so as to adjust the amount of light utilized in imaging when the two aperture blades are located at the minimum aperture position. Since the configuration of the ND filter is well-known, the description will be omitted. Even if the ND filter is used thus, the light amount can be adjusted when the two aperture blades are located at the minimum aperture position.

DESCRIPTION OF REFERENCE NUMERALS

10 Aperture stop mechanism,
12 Base unit,
14 Aperture blade,
14a Recess,
14f First edge portion,
14g Second edge portion,
14h Third edge portion,
16 Aperture blade,
16a Recess,
16e Connecting hole,
16f First edge portion,
16g Second edge portion,
16h Third edge portion,
20 Base plate,
20a Fixed aperture hole,
22 Drive mechanism,
50 Light passage opening,
100 Aperture stop mechanism,
114 Aperture blade,
116 Aperture blade,
150 Light passage opening,
200 Aperture stop mechanism,
214 Aperture blade,
216 Aperture blade,
250 Light passage opening

INDUSTRIAL APPLICABILITY

The present invention is available for an aperture stop mechanism, and available particularly for an aperture stop mechanism which drives two aperture blades and adjusts an aperture area of a light passage opening into which light for imaging is introduced.

What is claimed is:

1. An aperture stop mechanism comprising:
a base plate having a fixed aperture hole;
two aperture blades operative to be arranged so as to overlap each other and form a single light passage opening, into which light utilized in imaging is introduced, with the respective edge portions of the two aperture blades; and
a drive mechanism operative to drive the two aperture blades in directions different from each other and thereby change an aperture area of the light passage opening while light-shielding the fixed aperture hole,
wherein the two aperture blades are provided so as to form the single light passage opening, surrounded by boundaries including n (n=6, 8, 10) straight lines, with the respective edge portions of the two aperture blades, release light shielding of the fixed aperture hole so that the fixed aperture hole is opened at a predetermined maximum aperture position, form the light passage opening having an n-polygonal flat-shape at a predetermined minimum aperture position, form the light passage opening of a regular n-polygon at a predetermined proximate position between the maximum aperture position and the minimum aperture position, and form, from the maximum aperture position to a predetermined halfway position toward the predetermined proximate position, the light passage opening in which a part of the fixed aperture hole and the edge portions are combined.

2. The aperture stop mechanism according to claim 1, wherein the fixed aperture hole is substantially circular.

3. The aperture stop mechanism according to claim 2, wherein the two aperture blades form, from the maximum aperture position to a predetermined halfway position toward the predetermined proximate position, the light passage opening in which a circular arc of the fixed aperture hole and the edge portions are combined.

4. The aperture stop mechanism according to claim 1, further comprising light amount adjustment means operative to adjust an amount of light passing through the light passage opening and utilized in imaging, the light amount adjustment means adjusting the amount of light utilized in imaging when the two aperture blades are located at the minimum aperture position.

5. The aperture stop mechanism according to claim 3, further comprising light amount adjustment means operative to adjust an amount of light passing through the light passage opening and utilized in imaging, the light amount adjustment means adjusting the amount of light utilized in imaging when the two aperture blades are located at the minimum aperture position.

6. The aperture stop mechanism according to claim 1, wherein edge portions of the two aperture blades are formed to be circumscribed with a virtual circle having an aperture area for realizing a predetermined F value.

7. The aperture stop mechanism according to claim 3, wherein edge portions of the two aperture blades are formed to be circumscribed with a virtual circle having an aperture area for realizing a predetermined F value.

8. The aperture stop mechanism according to claim 1, wherein the two aperture blades are each formed so that a flatness ratio obtained by dividing a maximum width of the light passage opening by a width in a direction vertical to a direction of the maximum width is more than 1 and not more than 1.4 when the two aperture blades are at the minimum aperture position.

9. The aperture stop mechanism according to claim 3, wherein the two aperture blades are each formed so that a flatness ratio obtained by dividing a maximum width of the light passage opening by a width in a direction vertical to a direction of the maximum width is more than 1 and not more than 1.4 when the two aperture blades are at the minimum aperture position.

10. The aperture stop mechanism according to claim 4, wherein the two aperture blades are each formed so that a flatness ratio obtained by dividing a maximum width of the light passage opening by a width in a direction vertical to a direction of the maximum width is more than 1 and not more than 1.4 when the two aperture blades are at the minimum aperture position.

11. The aperture stop mechanism according to claim 5, wherein the two aperture blades are each formed so that a flatness ratio obtained by dividing a maximum width of the light passage opening by a width in a direction vertical to a direction of the maximum width is more than 1 and not more than 1.4 when the two aperture blades are at the minimum aperture position.

* * * * *